(12) United States Patent
Park et al.

(10) Patent No.: US 11,595,891 B2
(45) Date of Patent: Feb. 28, 2023

(54) TECHNIQUES FOR SIGNALING GO-TO-SLEEP FOR MULTIPLE TRANSMISSION/RECEPTION POINTS

(71) Applicant: QUALCOMM Incorporated, San Diego, CA (US)

(72) Inventors: Sungwoo Park, San Diego, CA (US); Xiaoxia Zhang, San Diego, CA (US); Mostafa Khoshnevisan, San Diego, CA (US); Tao Luo, San Diego, CA (US); Jing Sun, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/789,400

(22) Filed: Feb. 12, 2020

(65) Prior Publication Data

US 2020/0296667 A1    Sep. 17, 2020

Related U.S. Application Data

(60) Provisional application No. 62/818,586, filed on Mar. 14, 2019.

(51) Int. Cl.
*H04W 52/02* (2009.01)
*H04W 72/04* (2009.01)
(Continued)

(52) U.S. Cl.
CPC ... *H04W 52/0216* (2013.01); *H04W 52/0229* (2013.01); *H04W 52/0274* (2013.01);
(Continued)

(58) Field of Classification Search
CPC ......... H04W 52/0216; H04W 52/0229; H04W 72/042; H04W 52/0274; H04W 76/27;
(Continued)

(56) References Cited

U.S. PATENT DOCUMENTS

2016/0165539 A1    6/2016    Yi et al.
2016/0192433 A1*   6/2016    Deenoo ............... H04W 72/046
                                                        370/329
(Continued)

FOREIGN PATENT DOCUMENTS

EP          3788822 A1      3/2021
WO     WO-2015063591 A2     5/2015
(Continued)

OTHER PUBLICATIONS

3GPP TSG-RAN WG2 Meeting #105 ; R2-1900256; Source OPPO; Title:Power Saving Schemes with enhancements to C-DRX Athen, Greece, Feb. 25-Mar. 1, 2019 (Year: 2019).*
(Continued)

*Primary Examiner* — Mohammed S Chowdhury
(74) *Attorney, Agent, or Firm* — Dalei Dong; Holland & Hart LLP

(57) ABSTRACT

Methods, systems, and devices for wireless communications are described in which a user equipment (UE) may monitor for transmissions during an on-duration of a discontinuous reception cycle. The UE may receive one or more go-to-sleep indications from one or more transmission/reception points (TRPs), and may discontinue monitoring for transmissions from one or more of the TRPs responsive to the one or more go-to-sleep indications. Each TRP of the two or more TRPs may transmit a separate per-TRP go-to-sleep signal that indicates that the TRP will not transmit during a time period associated the go-to-sleep signal. In other cases, a TRP may transmit a cross-TRP go-to-sleep signal that has go-to-sleep indications for multiple TRPs.

25 Claims, 21 Drawing Sheets

(51) Int. Cl.
*H04W 76/27* (2018.01)
*H04W 76/28* (2018.01)
(52) U.S. Cl.
CPC ......... *H04W 72/042* (2013.01); *H04W 76/27* (2018.02); *H04W 76/28* (2018.02)
(58) Field of Classification Search
CPC ... H04W 76/28; H04W 52/0235; Y02D 30/70
See application file for complete search history.

(56) References Cited

U.S. PATENT DOCUMENTS

| | | | |
|---|---|---|---|
| 2016/0242231 A1* | 8/2016 | Vajapeyam | H04W 76/28 |
| 2019/0363843 A1* | 11/2019 | Gordaychik | H04L 5/0058 |
| 2020/0029302 A1* | 1/2020 | Cox | H04W 56/0015 |
| 2020/0037396 A1* | 1/2020 | Islam | H04W 76/27 |
| 2020/0178172 A1* | 6/2020 | Thangarasa | H04W 52/02 |
| 2020/0214078 A1* | 7/2020 | Jiang | H04W 72/1257 |
| 2020/0229092 A1* | 7/2020 | Wu | H04W 76/28 |
| 2020/0229095 A1* | 7/2020 | Shrestha | H04W 52/0235 |

FOREIGN PATENT DOCUMENTS

| | | |
|---|---|---|
| WO | WO-2019028825 A1 | 2/2019 |
| WO | WO-2020048457 A1 * | 3/2020 ............... H04L 5/00 |

OTHER PUBLICATIONS

3GPP TSG-RAN WG2 Meeting#105 ;R2-1900623; Source: ZTE Corporation, Sanechips; Title: Consideration on power saving scheme with DRX adaptation; Athens, Greece, Feb. 25-Mar. 1, 2019. (Year: 2019).*
3GPP TSG-RAN2 Meeting#105; R2-1901287; Source: Huawei, HiSilicon; Title: Discussion on C-DRX enhancement for UE power saving; Athens, Greece, Feb. 25-Mar. 1, 2019 (Year: 2019).*
International Search Report and Written Opinion—PCT/US2020/018125—ISA/EPO—dated Jun. 3, 2020 (191755WO).
Nokia, et al., "Comparison of DRX with WUS and GTS Schemes," 3GPP Draft, 3GPP TSG RAN WG1 #96, R1-1903133, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 25, 2019-Mar. 1, 2019, Feb. 15, 2019 (Feb. 15, 2019), XP051600829, 15 pages, Retrieved from the Internet:URL:http://www.3gpp.org/ftp/tsg%5Fran/WG1%5FRL1/TSGR1%5F96/Docs/R1%2D1903133%2Ezip [retrieved on Feb. 15, 2019], p. 7-p. 1/\0, figure 5.

* cited by examiner

TECHNIQUES FOR SIGNALING GO-TO-SLEEP FOR MULTIPLE TRANSMISSION/RECEPTION POINTS

CROSS REFERENCE

The present Application for Patent claims the benefit of U.S. Provisional Patent Application No. 62/818,586 by PARK et al., entitled "TECHNIQUES FOR SIGNALING GO-TO-SLEEP FOR MULTIPLE TRANSMISSION/RECEPTION POINTS," filed Mar. 14, 2019, assigned to the assignee hereof, which is hereby incorporated by reference in its entirety.

FIELD OF DISCLOSURE

The present disclosure, for example, relates to wireless communications systems, and more particularly to techniques for signaling go-to-sleep for multiple transmission/reception points.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless communications systems, a UE may support operations in a discontinuous reception (DRX) mode, where the UE may transition to a sleep mode and periodically wake up to monitor for data or control information from a base station in accordance with a DRX cycle. As such, the UE may save power since the UE may not have to constantly stay awake or constantly monitor for data or control information from the base station. In such systems, efficient mechanisms to transition a UE between sleep mode and wake up mode may be desirable to further reduce power consumption at the UE.

SUMMARY

The described techniques relate to improved methods, systems, devices, and apparatuses that support signaling of go-to-sleep for multiple transmission/reception points. In various aspects, described techniques provide that a user equipment (UE) may monitor for transmissions (e.g., physical downlink control channel (PDCCH) transmissions) from two or more transmission/reception points (TRPs) during an on-duration of a discontinuous reception cycle. The UE, in some cases, may receive one or more go-to-sleep indications from one or more TRPs, and may discontinue monitoring for transmissions from one or more of the TRPs responsive to the one or more go-to-sleep indications. In some cases, each TRP of the two or more TRPs may transmit a separate go-to-sleep signal that indicates that some TRPs will not transmit during a time period associated with the go-to-sleep signal. In other cases, a TRP may transmit a cross-TRP go-to-sleep signal that has go-to-sleep indications for multiple TRPs. Additionally or alternatively, a UE may be configured with an identification of one or more TRPs of a number of TRPs that may transmit go-to-sleep signals, and the UE may monitor for go-to-sleep signals from the identified TRPs.

A method of wireless communication at a UE is described. The method may include monitoring control channel transmissions from a set of transmission/reception points for an on-duration of a discontinuous reception cycle, receiving, from at least a first transmission/reception point of the set of transmission/reception points, a go-to-sleep signal that indicates the UE is to discontinue the monitoring for the control channel transmissions from at least a second transmission/reception point of the set of transmission/reception points, and discontinuing, responsive to the receiving, the monitoring for the control channel transmissions from at least the second transmission/reception point of the set of transmission/reception points.

An apparatus for wireless communication at a UE is described. The apparatus may include a processor, memory in electronic communication with the processor, and instructions stored in the memory. The instructions may be executable by the processor to cause the apparatus to monitor control channel transmissions from a set of transmission/reception points for an on-duration of a discontinuous reception cycle, receive, from at least a first transmission/reception point of the set of transmission/reception points, a go-to-sleep signal that indicates the UE is to discontinue the monitoring for the control channel transmissions from at least a second transmission/reception point of the set of transmission/reception points, and discontinue, responsive to the receiving, the monitoring for the control channel transmissions from at least the second transmission/reception point of the set of transmission/reception points.

Another apparatus for wireless communication at a UE is described. The apparatus may include means for monitoring control channel transmissions from a set of transmission/reception points for an on-duration of a discontinuous reception cycle, receiving, from at least a first transmission/reception point of the set of transmission/reception points, a go-to-sleep signal that indicates the UE is to discontinue the monitoring for the control channel transmissions from at least a second transmission/reception point of the set of transmission/reception points, and discontinuing, responsive to the receiving, the monitoring for the control channel transmissions from at least the second transmission/reception point of the set of transmission/reception points.

A non-transitory computer-readable medium storing code for wireless communication at a UE is described. The code may include instructions executable by a processor to monitor control channel transmissions from a set of transmission/reception points for an on-duration of a discontinuous reception cycle, receive, from at least a first transmission/reception point of the set of transmission/reception points, a go-to-sleep signal that indicates the UE is to discontinue the monitoring for the control channel transmissions from at least a second transmission/reception point of the set of transmission/reception points, and discontinue, responsive to the receiving, the monitoring for the control channel transmissions from at least the second transmission/reception point of the set of transmission/reception points.

In some examples of the method, apparatuses, and non-transitory computer-readable medium described herein, the receiving may include operations, features, means, or instructions for receiving separate go-to-sleep signals from two or more transmission/reception points of the set of transmission/reception points, and where the discontinuing includes discontinuing the monitoring for the control channel transmissions from each of the two or more first transmission/reception points based on the respective go-to-sleep signal. In some examples of the method, apparatuses, and non-transitory computer-readable medium described herein, at least a first go-to-sleep signal and a second go-to-sleep signal of the separate go-to-sleep signals may be independent of each other, and where the second go-to-sleep signal may be received before, concurrently with, or after, the first go-to-sleep signal.

In some examples of the method, apparatuses, and non-transitory computer-readable medium described herein, the receiving may include operations, features, means, or instructions for receiving a cross-transmission/reception point go-to-sleep signal from the first transmission/reception point of the set of transmission/reception points that indicates the UE is to discontinue the monitoring for the control channel transmissions from one or more of the first transmission/reception point or a second transmission/reception point of the set transmission/reception points, and where the discontinuing includes discontinuing the monitoring for the control channel transmissions from the one or more of the first transmission/reception point or the second transmission/reception point that is indicated in the cross-transmission/reception point go-to-sleep signal.

In some examples of the method, apparatuses, and non-transitory computer-readable medium described herein, the cross-transmission/reception point go-to-sleep signal indicates a subset of transmission/reception points of the set of transmission/reception points for which the UE is to discontinue the monitoring for the control channel transmissions. In some examples of the method, apparatuses, and non-transitory computer-readable medium described herein, the cross-transmission/reception point go-to-sleep signal provides explicit indication of indices of the subset of transmission/reception points or an indication of transmission configuration indication states corresponding to the indices of the subset of transmission/reception points, and where the UE discontinues monitoring for the control channel transmissions from each transmission/reception point indicated by the indices. In some examples of the method, apparatuses, and non-transitory computer-readable medium described herein, the cross-transmission/reception point go-to-sleep signal further indicates a go-to-sleep duration for each transmission/reception point of the subset of transmission/reception points, and where the UE discontinues monitoring for the control channel transmissions from each of the subset of transmission/reception points for a time duration corresponding to the indicated go-to-sleep duration of each transmission/reception point of the subset of transmission/reception points.

In some examples of the method, apparatuses, and non-transitory computer-readable medium described herein, the cross-transmission/reception point go-to-sleep signal indicates that the UE is to discontinue the monitoring for the control channel transmissions from all of the set of transmission/reception points. In some examples of the method, apparatuses, and non-transitory computer-readable medium described herein, the go-to-sleep signal indicates a time duration during which the UE is to discontinue monitoring for the control channel transmissions.

In some examples of the method, apparatuses, and non-transitory computer-readable medium described herein, the discontinuing the monitoring for the control channel transmissions includes deactivating one or more antenna panels at the UE associated with one or more transmission/reception points of the set of transmission/reception points.

Some examples of the method, apparatuses, and non-transitory computer-readable medium described herein may further include operations, features, means, or instructions for receiving a go-to-sleep configuration that indicates a subset of transmission/reception points that can transmit go-to-sleep signals, and monitoring for the go-to-sleep signal from the subset of transmission/reception points. In some examples of the method, apparatuses, and non-transitory computer-readable medium described herein, the subset of transmission/reception points include only anchor transmission/reception points of the set of transmission/reception points. In some examples of the method, apparatuses, and non-transitory computer-readable medium described herein, the go-to-sleep configuration indicates that an anchor transmission/reception point of the set of transmission/reception points can transmit a cross-transmission/reception point go-to-sleep signal, and that non-anchor transmission/reception points can transmit go-to-sleep signals only for the associated non-anchor transmission/reception point.

Some examples of the method, apparatuses, and non-transitory computer-readable medium described herein may further include operations, features, means, or instructions for receiving the cross-transmission/reception point go-to-sleep signal from the anchor transmission/reception point, and deactivating one or more antenna panels at the UE associated with one or more transmission/reception points indicated in the cross-transmission/reception point go-to-sleep signal. Some examples of the method, apparatuses, and non-transitory computer-readable medium described herein may further include operations, features, means, or instructions for receiving the go-to-sleep signal from the first non-anchor transmission/reception point, and deactivating one or more antenna panels at the UE associated with the first non-anchor transmission/reception point.

In some examples of the method, apparatuses, and non-transitory computer-readable medium described herein, the go-to-sleep configuration may be received in a radio resource control message from the anchor transmission/reception point. In some examples of the method, apparatuses, and non-transitory computer-readable medium described herein, the go-to-sleep signal may be received in one or more of a medium access control element, a downlink control information message, or a radio resource control message.

A method of wireless communication at a base station is described. The method may include determining that one or more transmission/reception points of a set of transmission/reception points have insufficient control information or data for a transmission to a UE during an on-duration of a discontinuous reception cycle and transmitting one or more go-to-sleep indications to the UE that identify the determined one or more transmission/reception points of the set of transmission/reception points for which the UE is to discontinue monitoring for control channel transmissions.

An apparatus for wireless communication at a base station is described. The apparatus may include a processor, memory in electronic communication with the processor, and instructions stored in the memory. The instructions may be executable by the processor to cause the apparatus to determine that one or more transmission/reception points of a set of transmission/reception points have insufficient control information or data for a transmission to a UE during an on-duration of a discontinuous reception cycle and transmit one or more go-to-sleep indications to the UE that identify the determined one or more transmission/reception points of the set of transmission/reception points for which the UE is to discontinue monitoring for control channel transmissions.

Another apparatus for wireless communication at a base station is described. The apparatus may include means for determining that one or more transmission/reception points of a set of transmission/reception points have insufficient control information or data for a transmission to a UE during an on-duration of a discontinuous reception cycle and transmitting one or more go-to-sleep indications to the UE that identify the determined one or more transmission/reception points of the set of transmission/reception points for which the UE is to discontinue monitoring for control channel transmissions.

A non-transitory computer-readable medium storing code for wireless communication at a base station is described. The code may include instructions executable by a processor to determine that one or more transmission/reception points of a set of transmission/reception points have insufficient control information or data for a transmission to a UE during an on-duration of a discontinuous reception cycle and transmit one or more go-to-sleep indications to the UE that identify the determined one or more transmission/reception points of the set of transmission/reception points for which the UE is to discontinue monitoring for control channel transmissions.

In some examples of the method, apparatuses, and non-transitory computer-readable medium described herein, each transmission/reception point of the set of transmission/reception points transmits a separate go-to-sleep signal to the UE independently of whether other transmission/reception points of the set of transmission/reception points transmits the go-to-sleep signal.

In some examples of the method, apparatuses, and non-transitory computer-readable medium described herein, the go-to-sleep signal may be a cross-transmission/reception point go-to-sleep signal that indicates a subset of transmission/reception points of the set of transmission/reception points for which the UE is to discontinue the monitoring for the control channel transmissions. In some examples of the method, apparatuses, and non-transitory computer-readable medium described herein, the cross-transmission/reception point go-to-sleep signal provides an explicit indication of indices of the subset of transmission/reception points or an indication of transmission configuration indication states corresponding to the indices of the subset of transmission/reception points. In some examples of the method, apparatuses, and non-transitory computer-readable medium described herein, the cross-transmission/reception point go-to-sleep signal further indicates a go-to-sleep duration for each transmission/reception point of the subset of transmission/reception points.

Some examples of the method, apparatuses, and non-transitory computer-readable medium described herein may further include operations, features, means, or instructions for transmitting a go-to-sleep configuration to the UE, the go-to-sleep configuration indicating one or more of the set of transmission/reception points from which the UE is to monitor for go-to-sleep signals. In some examples of the method, apparatuses, and non-transitory computer-readable medium described herein, the go-to-sleep configuration indicates that an anchor transmission/reception point of the set of transmission/reception points can transmit a cross-transmission/reception point go-to-sleep signal, and that non-anchor transmission/reception points can transmit a go-to-sleep signal only for the associated non-anchor transmission/reception point.

In some examples of the method, apparatuses, and non-transitory computer-readable medium described herein, the go-to-sleep configuration may be transmitted in a radio resource control message to the UE. In some examples of the method, apparatuses, and non-transitory computer-readable medium described herein, the at least one go-to-sleep signal may be transmitted in one or more of a medium access control element, a downlink control information message, or a radio resource control message.

A method of wireless communication at a base station is described. The method may include transmitting a go-to-sleep configuration to a UE, the go-to-sleep configuration indicating one or more of a set of transmission/reception points from which the UE is to monitor for go-to-sleep signals, identifying one or more of the set of transmission/reception points that have insufficient control information or data for a transmission to the UE during an on-duration of a discontinuous reception cycle, and transmitting at least one go-to-sleep signal to the UE prior to or during the on-duration state in the discontinuous reception cycle via at least a first transmission/reception point of the indicated one or more of the set of transmission/reception points, the at least one go-to-sleep signal indicating that the UE is to discontinue monitoring for transmissions of the identified one or more transmission/reception points during the on-duration of the discontinuous reception cycle.

An apparatus for wireless communication at a base station is described. The apparatus may include a processor, memory in electronic communication with the processor, and instructions stored in the memory. The instructions may be executable by the processor to cause the apparatus to transmit a go-to-sleep configuration to a UE, the go-to-sleep configuration indicating one or more of a set of transmission/reception points from which the UE is to monitor for go-to-sleep signals, identify one or more of the set of transmission/reception points that have insufficient control information or data for a transmission to the UE during an on-duration of a discontinuous reception cycle, and transmit at least one go-to-sleep signal to the UE prior to or during the on-duration state in the discontinuous reception cycle via at least a first transmission/reception point of the indicated one or more of the set of transmission/reception points, the at least one go-to-sleep signal indicating that the UE is to discontinue monitoring for transmissions of the identified one or more transmission/reception points during the on-duration of the discontinuous reception cycle.

Another apparatus for wireless communication at a base station is described. The apparatus may include means for transmitting a go-to-sleep configuration to a UE, the go-to-sleep configuration indicating one or more of a set of transmission/reception points from which the UE is to monitor for go-to-sleep signals, identifying one or more of the set of transmission/reception points that have insufficient control information or data for a transmission to the UE during an on-duration of a discontinuous reception cycle, and transmitting at least one go-to-sleep signal to the UE prior to or during the on-duration state in the discontinuous reception cycle via at least a first transmission/reception point of the indicated one or more of the set of transmission/reception points, the at least one go-to-sleep signal indicating that the UE is to discontinue monitoring for transmissions of the identified one or more transmission/reception points during the on-duration of the discontinuous reception cycle.

A non-transitory computer-readable medium storing code for wireless communication at a base station is described. The code may include instructions executable by a processor to transmit a go-to-sleep configuration to a UE, the go-to-sleep configuration indicating one or more of a set of transmission/reception points from which the UE is to monitor for go-to-sleep signals, identify one or more of the set of transmission/reception points that have insufficient control information or data for a transmission to the UE during an on-duration of a discontinuous reception cycle, and transmit at least one go-to-sleep signal to the UE prior to or during the on-duration state in the discontinuous reception cycle via at least a first transmission/reception point of the indicated one or more of the set of transmission/reception points, the at least one go-to-sleep signal indicating that the UE is to discontinue monitoring for transmissions of the identified one or more transmission/reception points during the on-duration of the discontinuous reception cycle.

In some examples of the method, apparatuses, and non-transitory computer-readable medium described herein, the go-to-sleep configuration indicates one or more anchor transmission/reception points that the UE is to monitor for go-to-sleep signals, and where the first transmission/reception point is an anchor transmission/reception point.

In some examples of the method, apparatuses, and non-transitory computer-readable medium described herein, the at least one go-to-sleep signal may be a cross-transmission/reception point go-to-sleep signal indicates a subset of transmission/reception points of the set of transmission/reception points for which the UE is to discontinue the monitoring for the control channel transmissions. In some examples of the method, apparatuses, and non-transitory computer-readable medium described herein, the cross-transmission/reception point go-to-sleep signal provides explicit indication of indices of the subset of transmission/reception points or an indication of transmission configuration indication states corresponding to the indices of the subset of transmission/reception points. In some examples of the method, apparatuses, and non-transitory computer-readable medium described herein, the cross-transmission/reception point go-to-sleep signal further indicates a go-to-sleep duration for each transmission/reception point of the subset of transmission/reception points.

In some examples of the method, apparatuses, and non-transitory computer-readable medium described herein, the go-to-sleep configuration further indicates that the UE is to discontinue the monitoring for the control channel transmissions from all of the set of transmission/reception points responsive to a go-to-sleep signal from an anchor transmission/reception point. In some examples of the method, apparatuses, and non-transitory computer-readable medium described herein, the go-to-sleep configuration indicates that an anchor transmission/reception point of the set of transmission/reception points can transmit a cross-transmission/reception point go-to-sleep signal, and that non-anchor transmission/reception points can transmit a go-to-sleep signal only for the associated non-anchor transmission/reception point.

In some examples of the method, apparatuses, and non-transitory computer-readable medium described herein, the go-to-sleep configuration may be transmitted in a radio resource control message to the UE. In some examples of the method, apparatuses, and non-transitory computer-readable medium described herein, the at least one go-to-sleep signal may be transmitted in one or more of a medium access control element, a downlink control information message, or a radio resource control message

DETAILED DESCRIPTION

Figure 1:
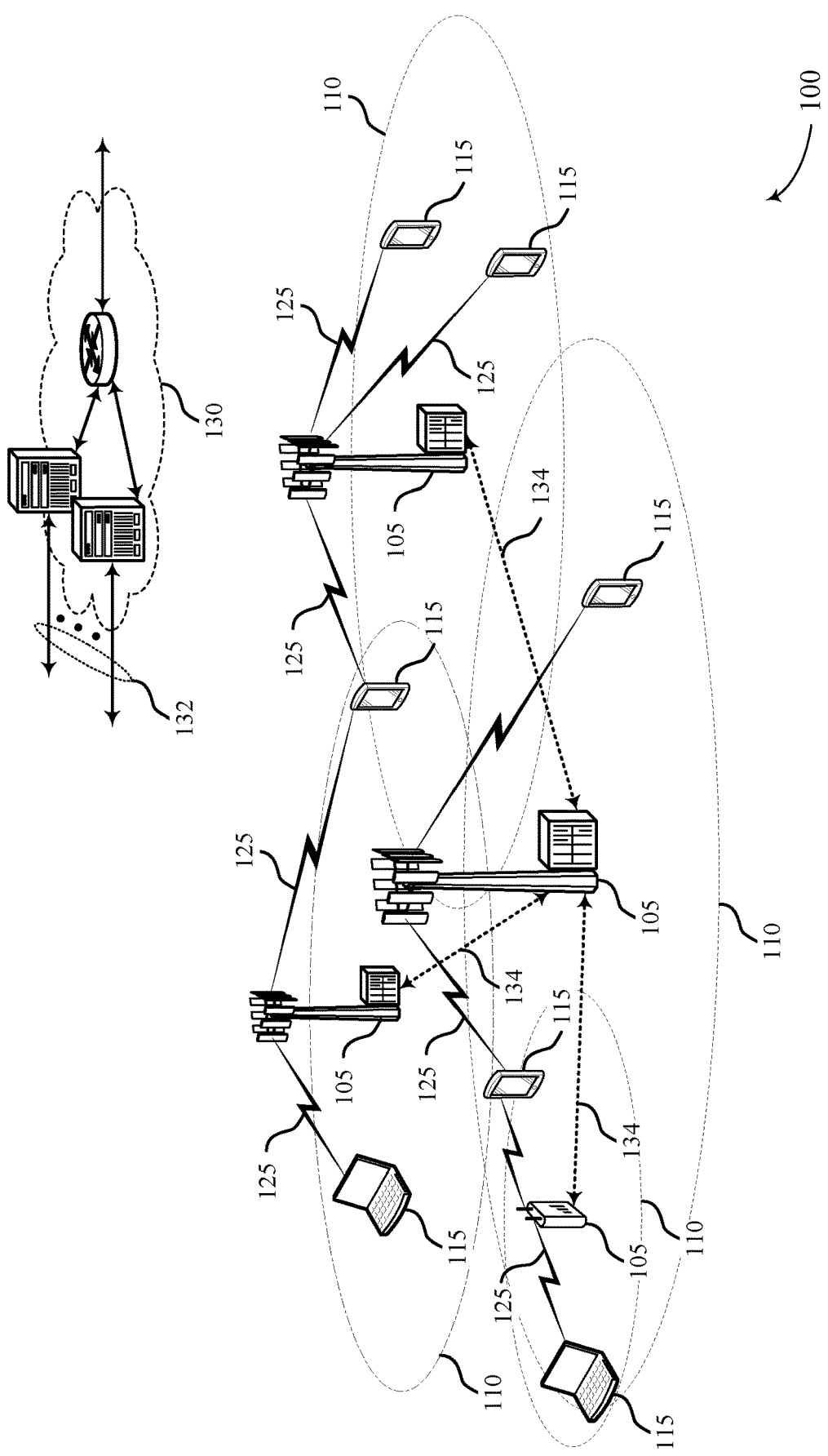
FIG. 1 illustrates an example of a wireless communications system that supports techniques for signaling go-to-sleep for multiple transmission/reception points in accordance with various aspects of the present disclosure.

In some wireless communications systems, a user equipment (UE) may support operations in a discontinuous reception (DRX) mode. While operating in a DRX mode, the UE may transition to a sleep mode in an off-duration of a DRX cycle and the UE may wake up during an on-duration of the DRX cycle to monitor for data or control information from one or more base stations or transmission/reception points (TRPs). Since the UE may transition to a sleep mode in the off-duration of the DRX cycle when operating in the DRX mode, the UE may save power when operating in the DRX mode. In some cases, to further reduce power consumption, the UE may be configured to transition to the sleep mode prior to the end of an on-duration upon receipt of a go-to-sleep signal. In some cases, the UE may be communicating on multiple transceiver chains/panels with multiple TRPs (e.g., operated by one or more base stations). In accordance with various techniques as described herein, a UE in communication with multiple TRPs may receive one or more go-to-sleep signals that may indicate to the UE to discontinue monitoring for transmissions from one or more TRPs of the multiple TRPs. The UE, responsive to receiving the one or more go-to-sleep signals, may completely or partially turn off receive circuitry (e.g., a transceiver chain associated with an antenna panel) used to receive communications from the one or more TRPs indicated in the go-to-sleep signal(s).

In some aspects of the disclosure, a UE may monitor for one or more go-to-sleep signals from one or more TRPs based on a configuration for go-to-sleep signaling. In some cases, each TRP of the multiple TRPs may transmit a separate go-to-sleep signal that indicates that the TRP that sends the go-to-sleep signal will not transmit during a time period associated with the go-to-sleep signal. A go-to-sleep signal that indicates that the TRP which sent the go-to-sleep signal will not transmit may be referred to herein as a "per-TRP go-to-sleep signal" or "per-TRP GTS." In other cases, a TRP may transmit a go-to-sleep signal that indicates one or more TRPs other than the TRP which sent the go-to-sleep will not transmit during the time period associated with the go-to-sleep signal, which may be referred to herein as a "cross-TRP go-to-sleep signal," a "cross-TRP GTS," or "cross-panel GTS." In some cases, one TRP of the multiple TRPs (e.g., an anchor TRP) may transmit a cross-TRP go-to-sleep signal, and other TRPs of the multiple TRPs may transmit a per-TRP go-to-sleep signal. Additionally or alternatively, a UE may be configured with an identification of one or more TRPs of a number of TRPs that may transmit go-to-sleep signals, and the UE may monitor for go-to-sleep signals from the identified TRP(s).

Such techniques for signaling go-to-sleep may help to reduce power consumption at a UE by allowing the UE to power-down some components for additional time periods relative to cases where go-to-sleep signaling is not provided. Additionally, such techniques may enhance system efficiency by providing flexibility related to which TRPs of multiple TRPs used for communications with the UE may transmit go-to-sleep signals, and by providing go-to-sleep indications for multiple different TRPs in a single cross-TRP go-to-sleep signal. Further, in some cases, a go-to-sleep signal may indicate a time duration for which the UE is to remain in the sleep state, which may further enhance network efficiency and provide further UE power reductions.

Aspects of the disclosure are initially described in the context of a wireless communications system. Examples of processes and signaling exchanges that support go-to-sleep techniques for multiple TRPs are then described. Aspects of the disclosure are further illustrated by and described with reference to apparatus diagrams, system diagrams, and flowcharts that relate to techniques for signaling go-to-sleep for multiple transmission/reception points.

FIG. 1 illustrates an example of a wireless communications system 100 that supports techniques for signaling go-to-sleep for multiple transmission/reception points in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

For example, downlink transmissions on communication links 125 may include transmissions from multiple TRPs (e.g., operated by one or more base stations 105) to multiple antenna panels at a UE 115. In accordance with various techniques as described herein, a UE 115 in communication with multiple TRPs may receive one or more go-to-sleep signals that may indicate that the UE 115 may discontinue monitoring for transmissions from one or more TRPs of the multiple TRPs. The UE 115, responsive to receiving the one or more go-to-sleep signals, may turn off all or parts of receive circuitry (e.g., a transceiver associated with an antenna panel) used to receive communications from the one or more TRPs indicated in the go-to-sleep signal(s).

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some examples, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), unlicensed radio frequency spectrum band radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas or antenna panels and the receiving device is equipped with one or more antennas or antenna panels. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at some orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with an orientation (e.g., with respect to the antenna array of the transmitting device or receiving device, or with respect to some other orientation).

In one example, a base station 105 may use multiple antennas, multiple antenna panels, or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

In some cases, the antennas of a base station 105 or UE 115 may be located within one or more antenna arrays or antenna panels, which may support MIMO operations, or transmit or receive beamforming. For example, one or more base station antennas, antenna panels, or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna panels or antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In wireless communications system 100, as discussed herein, a UE 115 may support operation in a DRX mode (e.g., connected mode DRX (C-DRX)). While operating in a DRX mode, the UE 115 may transition to a sleep mode in off-durations of a DRX cycle, and the UE 115 may wake up during on-durations of the DRX cycle to monitor for data or control information from one or more base stations 105. In some cases, the transitions between sleep and awake states may be done without signaling (i.e., signaling free transitions) and base stations 105 may only schedule data or control information transmissions in on-durations of DRX cycles. Since the UE 115 may transition to a sleep mode in off-durations of the DRX cycle, the UE 115 may save power when operating in the DRX mode. Further, in accordance with various techniques as discussed herein, a UE 115 may transition one or more antenna panels, associated receive circuitry, or combinations thereof, to the sleep mode in response to receiving a go-to-sleep signal associated with one or more TRPs, which may provide flexibility to the wireless communications system 100 and power savings at the UE 115.

Figure 2:
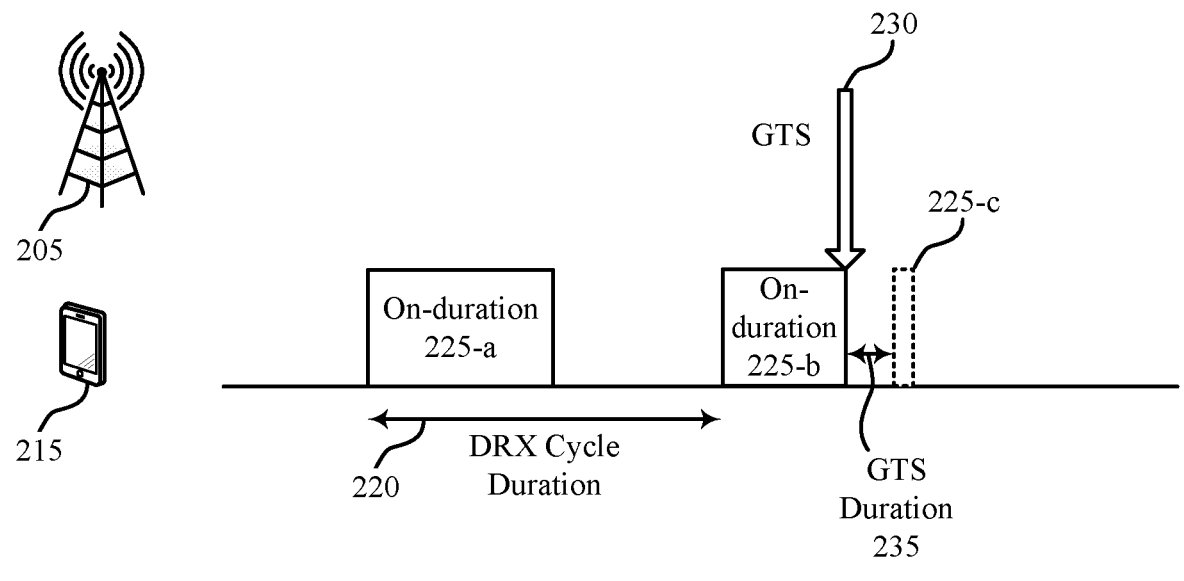
FIG. 2 illustrates an example of a discontinuous reception cycle with go-to-sleep signaling in accordance with various aspects of the present disclosure.

FIG. 2 illustrates an example of a discontinuous reception cycle 200 with go-to-sleep signaling in accordance with various aspects of the present disclosure. In some examples, discontinuous reception cycle 200 may be implemented in aspects of wireless communications system 100. The example of FIG. 2 includes a UE 215, which may be an example of a UE 115 described with reference to FIG. 1, and a base station 205, which may be an example of a base station 105 or TRP described with reference to FIG. 1.

In the example of FIG. 2, the UE 215 may wake up during on-duration 225-a, on-duration 225-b, and on-duration 225-c (collectively referred to as on-durations 225) and monitor for one or more transmissions (e.g., data transmissions in a physical downlink shared channel (PDSCH) or control information in a PDCCH) from the base station 205. The UE 215 may power down receive circuitry for those portions of DRX cycle duration 220 that follow the on-durations 225. In some cases, the base station 205 may have a relatively small amount of data or control information to be transmitted to the UE 215, and may transmit a go-to-sleep (GTS) signal 230 to the UE 215. The UE 215 may receive the GTS signal 230 and transition one or more antenna panels to a sleep mode, thereby further enhancing UE 215 power savings associated with DRX operations.

In the example of FIG. 2, the UE 215 may monitor for downlink transmissions during an initial on-duration 225-a and may discontinue monitoring at the expiration of the initial on-duration 225-a. In some cases, if data or control information is received during the initial on-duration 225-a, the UE 215 may initiate an inactivity timer after receipt and transition to the sleep mode at the expiration of the inactivity timer if the UE 215 fails to receive additional data or control information. At the beginning of the subsequent on-duration 225-b, the UE 215 may wake up and again monitor for data or control information. In this case, the base station 205 may transmit GTS signal 230 during the subsequent on-duration 225-b, and the UE 215 may immediately transition to the sleep mode responsive to receipt of the GTS signal 230. In some cases, the UE 215 may be configured with a GTS duration 235 that indicates an amount of time that the UE 215 is to remain in the sleep mode responsive to receiving the GTS signal 230. In some cases, the GTS signal 230 may indicate an amount of time of the GTS duration 235. In the example of FIG. 2, the GTS duration 235 may expire prior to the end of the DRX on-duration 225-b and the UE 215 may wake up and again monitor for data or control information for a third on-duration 225-c. In some cases, the GTS signal 230 may indicate a GTS duration 235 that spans less than a DRX on-duration 225, or that spans multiple DRX cycles.

In some cases, the base station 205 may control two or more TRPs, or different TRPs may be controlled by different base stations. In some cases, the GTS signal 230 may be a per-TRP GTS that indicates go-to-sleep only for the TRP that transmitted the GTS signal 230. In other cases, the GTS signal 230 may be a cross-TRP GTS that indicates one or multiple TRPs. In such cases, if the UE 215 is using multiple UE antenna panels to monitor for transmissions of the two or more TRPs, each antenna panel and associated receive components associated with the two or more TRPs indicated in the cross-TRP GTS may be powered down for the GTS duration 235. Such GTS signals 230 from one or more TRPs will be discussed in more detail for various examples with respect to FIGS. 3 through 6.

Figure 3:
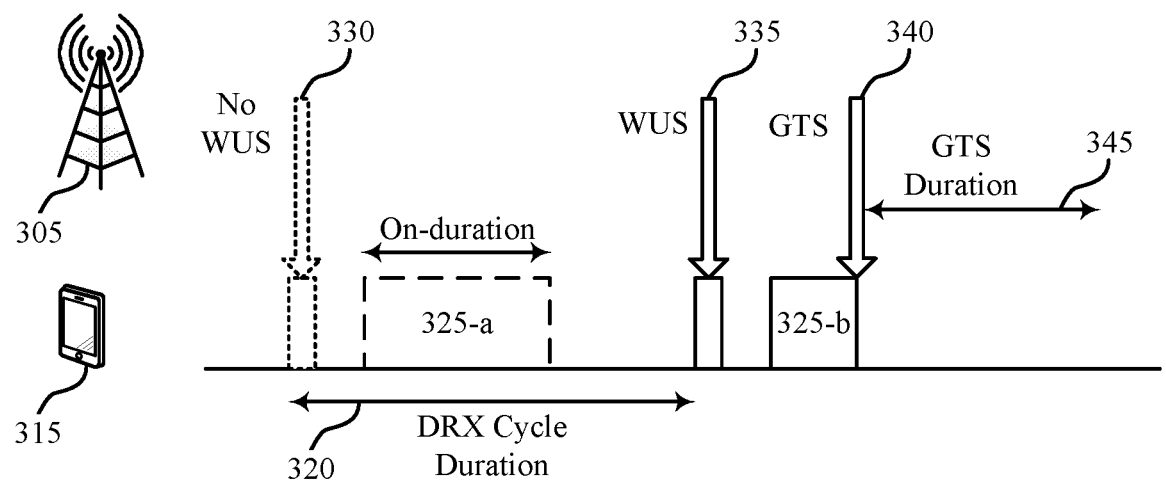
FIG. 3 illustrates an example of a discontinuous reception cycle with wake-up and go-to-sleep signaling in accordance with various aspects of the present disclosure.

FIG. 3 illustrates an example of a discontinuous reception cycle 300 with wake-up and go-to-sleep signaling in accordance with various aspects of the present disclosure. In some examples, discontinuous reception cycle 300 may be implemented in aspects of wireless communications system 100. The example of FIG. 3 includes a UE 315, which may be an example of the UEs described with reference to FIGS. 1 and 2, and a base station 305, which may be an example of a base station or TRP described with reference to FIGS. 1 and 2.

In some cases, to further limit power consumption at the UE 315, the UE 315 may be configured to only wake up in an on-duration of the DRX cycle 300 if the UE 315 receives a wake up signal (WUS) from base station 305 prior to or at the beginning of an on-duration 325-a within a DRX cycle duration 320. In the example of FIG. 3, the UE 315 may be scheduled with on-duration 325-a and on-duration 325-b (collectively referred to herein as on-durations 325) in the DRX cycle 300. However, at 330, for example, the UE 315 may fail to receive a WUS (e.g., prior to initial on-duration 325-a). Thus, UE 315 may avoid waking up for initial on-duration 325-a (i.e., the UE 315 may skip the initial on-duration 325-a). Then, in a subsequent DRX cycle, the UE 315 may receive a WUS 335 (e.g., prior to subsequent on-duration 325-*b*) indicating the presence of data or control information in the subsequent on-duration 325-*b*. Thus, the UE 315 may wake up for the subsequent on-duration 325-*b* and monitor for data or control information. In this example, the base station 305 may transmit a GTS signal 340, and the UE 315 may discontinue monitoring during the subsequent on-duration 325-*b*. The GTS signal 340 may indicate a GTS duration 345, which may correspond to a remaining duration of the DRX cycle 300 or may be a shorter or longer duration. In some cases, the base station 305 may determine that the GTS signal 340 is to be transmitted based on a downlink buffer associated with the UE 315. Following GTS duration 345, the UE 315 may monitor for a subsequent WUS in accordance with the DRX cycle 300 that is configured at the UE 315.

Similarly as discussed with respect to FIGS. 1 and 2, the GTS signal 340 may be a per-TRP GTS signal that indicates go-to-sleep only for the TRP that transmitted the GTS signal 340. In other cases, the GTS signal 340 may be a cross-TRP GTS that indicates one or multiple TRPs. In such cases, if the UE 315 is using multiple UE antenna panels to monitor for transmissions of the two or more TRPs, each antenna panel and corresponding receive components associated with the two or more TRPs indicated in the cross-TRP GTS may be powered down for the GTS duration 345. Such GTS signals 340 from one or more TRPs will be discussed in more detail for various examples with respect to FIGS. 4 through 6.

Figure 4:
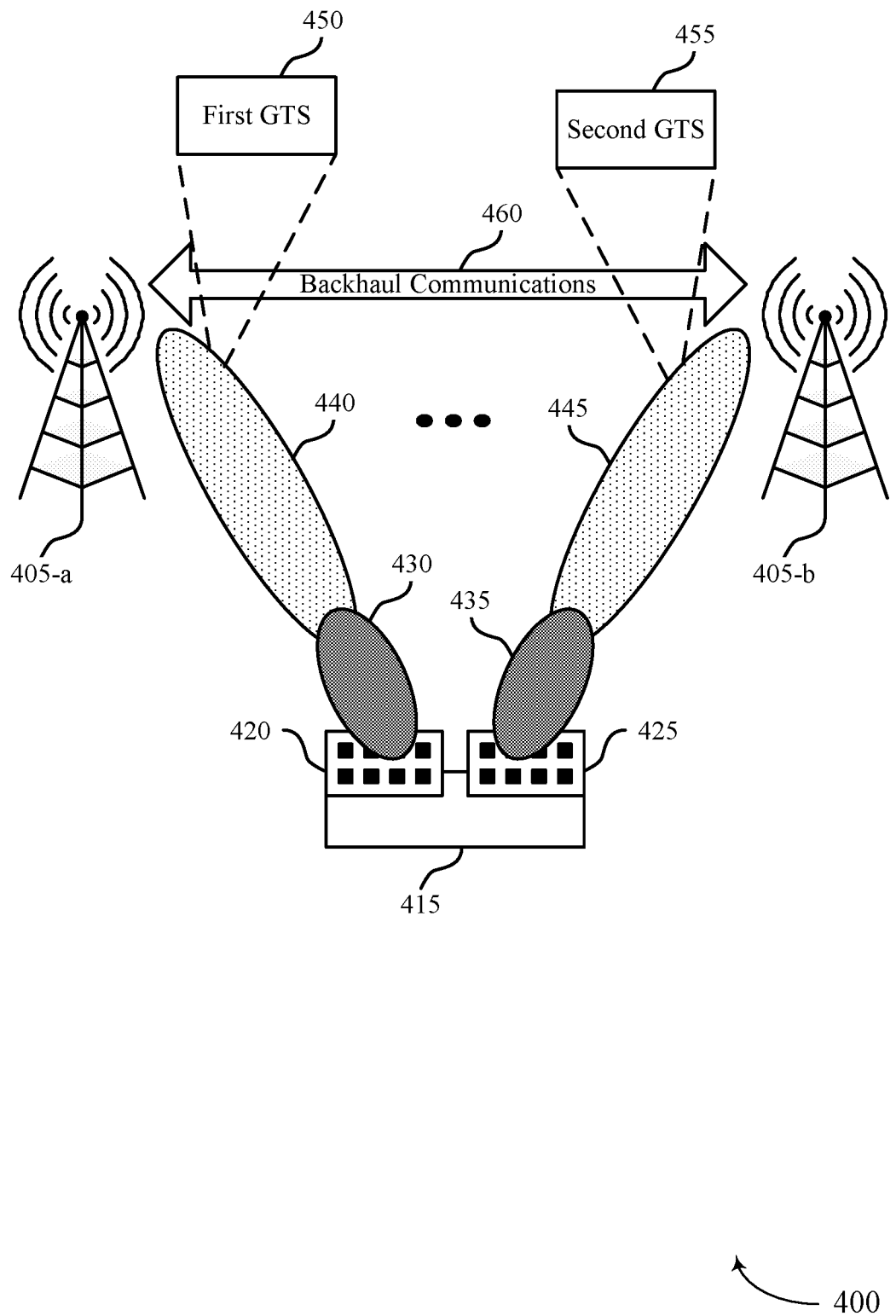
FIG. 4 illustrates an example of multiple transmission/reception point go-to-sleep signaling in accordance with various aspects of the present disclosure.

FIG. 4 illustrates an example of a multiple transmission/reception point go-to-sleep signaling 400 in accordance with various aspects of the present disclosure. In some examples, multiple transmission/reception point go-to-sleep signaling 400 may implement aspects of wireless communications system 100. In this example, a UE 415 may use multiple antenna panels, illustrated as a first antenna panel 420 and a second antenna panel 425, to communicate with a first TRP 405-*a* and a second TRP 405-*b* (collectively referred to herein as TRPs 405). In other examples, the UE 415 may include more than two antenna panels and may communicate with more than two TRPs 405. The UE 415 may be an example of a UE described with reference to FIGS. 1 through 3. The TRPs 405 may be an example of a TRP described with reference to FIGS. 1 through 3.

Each antenna panel may be used to monitor associated receive beams, with the first antenna panel 420 configured to monitor using a first receive beam 430 for an associated first transmission beam 440 from the first TRP 405-*a*. Likewise, the second antenna panel 425 may be configured to monitor using a second receive beam 435 for an associated second transmission beam 445 from the second TRP 405-*b*. The first TRP 405-*a* and the second TRP 405-*b* may be controlled, in some cases, by a same base station. In other cases, the first TRP 405-*a* and the second TRP 405-*b* may be associated with different base stations. The first TRP 405-*a* and the second TRP 405-*b* may communicate with each other via a backhaul link 460. In this example, the first TRP 405-*a* may transmit a first GTS signal 450 to the UE 415 via the first transmission beam 440, the first receive beam 430, and the first antenna panel 420. Likewise, the second TRP 405-*b* may transmit a second GTS signal 455 to the UE 415 via the second transmission beam 445, the second receive beam 435, and the second antenna panel 425.

In the example of FIG. 4, the UE 415 may initially have both the first antenna panel 420 and the second antenna panel 425 turned on. The UE 415 may power off the first antenna panel 420 after receiving the first GTS signal 450. The second GTS signal 455 may be independent of the first GTS signal 450 (i.e., both the first GTS signal 450 and the second GTS signal 455 are per-TRP GTS signals), and may be received before, concurrent with, or after the first GTS signal 450 is received. In such a manner, power at the UE 415 may be conserved through keeping less than all of the antenna panels powered on based on one or more received GTS signals.

In some cases, one or more of the first GTS signal 450 or the second GTS signal 455 may be a cross-TRP GTS that includes TRP-related information associated with the first TRP 405-*a* and the second TRP 405-*b*. In some cases, the TRP-related information in the cross-TRP GTS may include an indication of one or more TRPs, a GTS duration during which the UE 415 can switch off an associated antenna panel and corresponding receive circuitry, or combinations thereof. In some cases, a GTS duration may not be provided with the TRP-related information, and the UE 415 may use a default or semi-statically configured GTS duration. In some cases, the GTS duration may be a remainder of a DRX cycle. In other cases, the GTS duration may be dynamically indicated. In some cases, each TRP 405 may transmit a per-TRP GTS, and the UE 415 may identify the TRP 405 implicitly based on which TRP 405 transmitted the signal, and the UE 415 may skip monitoring for transmissions of the associated TRP 405 for the GTS duration.

In some cases, one or more of the first GTS signal 450 or the second GTS signal 455 may be cross-TRP GTS signals that indicate GTS for multiple TRPs 405. In some cases, the TRP-related information provided in the cross-TRP GTS signals may include, for example, a dynamic identifier of the one or more TRPs 405. In cases where a semi-static or preconfigured GTS duration is configured, the UE 415 in such cases can skip monitoring for transmissions from the indicated TRPs 405 for the GTS duration. In other cases, the TRP-related information in such dynamic cross-TRP indication may provide a GTS duration, and the UE can skip monitoring for transmissions from an indicated TRP 405 for the indicated GTS duration. The GTS duration can be different across the TRPs or common for all the TRPs. In some cases, the dynamic identifier of the one or more TRPs 405 may be provided through one or more index values that are mapped to the one or more TRPs 405 (e.g., TRPs may be associated with a TRP index that is provided in RRC signaling).

In other cases, the cross-TRP GTS may indicate to which TRPs 405 the GTS applies, based on a preconfigured rule. For example, a cross-TRP GTS can be predefined (e.g., via RRC signaling) to indicate that all the TRPs in a multi-TRP cluster will not transmit to the UE 415 for some time (e.g., during the GTS duration). In such cases, the cross-TRP GTS may identify the multi-TRP cluster (e.g., explicitly based on an identifier assigned to the multi-TRP cluster, or implicitly according to a multi-TRP cluster associated with a TRP that transmits the cross-TRP GTS).

In some cases, each of the TRPs 405 may be configured to transmit a cross-TRP GTS. In other cases, only the first TRP 405-*a* or the second TRP 405-*b* may be configured to transmit a cross-TRP GTS, and any other TRPs may either not transmit a GTS or may only transmit a per-TRP GTS. In some cases, only an anchor TRP, or one or more anchor TRPs, may transmit a cross-TRP GTS, and non-anchor TRPs may transmit only a per-TRP GTS. The UE 415, in some cases, may be configured with which TRPs can transmit a GTS, a type of GTS (e.g., per-TRP GTS or cross-TRP GTS) each TRP can transmit, a GTS duration if a dynamic GTS duration is not configured, or any combinations thereof.

Figure 5:
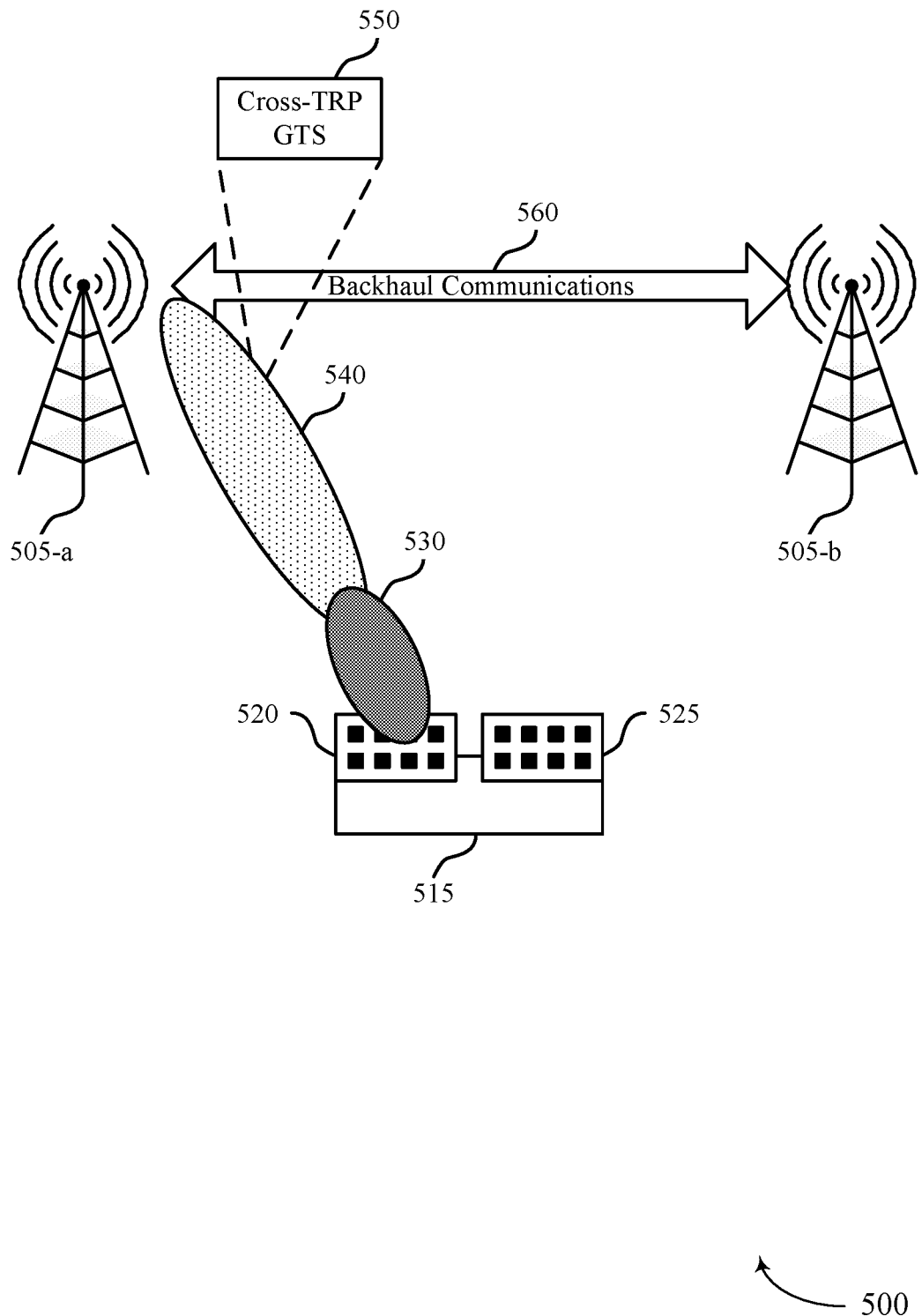
FIG. 5 illustrates an example of cross-transmission/reception point go-to-sleep signaling that supports techniques for signaling go-to-sleep for multiple transmission/reception points in accordance with various aspects of the present disclosure.

In some cases, a single TRP may be configured to transmit a GTS (e.g., a cross-TRP GTS), and one or more other TRPs may not transmit any GTS signals. FIG. 5 illustrates an example of cross-cross-transmission/reception point go-to-sleep signaling 500 that supports techniques for signaling go-to-sleep for multiple transmission/reception points in accordance with various aspects of the present disclosure. In some examples, cross-TRP GTS signaling 500 may be implemented aspects of wireless communications system 100. In this example, a UE 515 may use multiple antenna panels, illustrated as a first antenna panel 520 and a second antenna panel 525, to communicate with a first TRP 505-a and a second TRP 505-b (collectively referred to as TRPs 505). In other examples the UE 515 may include more than two antenna panels and may communicate with more than two TRPs 505. The UE 515 may be an example of a UE described with reference to FIGS. 1 through 4. The TRPs 505 may be an example of a base station or TRP described with reference to FIGS. 1 through 4.

Each antenna panel may be used to monitor associated receive beams, with the first antenna panel 520 configured to monitor using a first receive beam 530 for an associated first transmission beam 540 from the first TRP 505-a. Likewise, the second antenna panel 525 may be configured to monitor communications from the second TRP 505-b, and in this example may be powered down in accordance with a DRX configuration, lack of a WUS, or based on a prior GTS. The first TRP 505-a and the second TRP 505-b may be controlled, in some cases, by a same base station. In other cases, the first TRP 505-a and the second TRP 505-b may be associated with different base stations. The first TRP 505-a and the second TRP 505-b may communicate with each other via a backhaul link 560. In this example, the first TRP 505-a may transmit a cross-TRP GTS signal 550 to the UE 515 via the first transmit beam 540, the first receive beam 530, and the first antenna panel 520.

In some cases, the UE 515 may be configured to monitor for the cross-TRP GTS signal 550 only from the first TRP 505-a. For example, the UE 515 may be configured via RRC signaling of which TRPs 505 can send a GTS, which may be indicated with a DRX configuration that is provided via RRC signaling. In some cases, such as illustrated in FIG. 5, only one TRP 505-a (e.g., an anchor TRP) can send a GTS. In other cases, a subset of TRPs 505 that the UE 515 may communicate with are configured to send GTS (e.g., a subset of anchor TRPs can send GTS and a different subset of non-anchor TRPs cannot send GTS).

In other cases, such as illustrated in FIG. 4, each TRP can send a GTS, but only one TRP (e.g., first TRP 405-a) can transmit a cross-TRP GTS (or a subset of TRPs, such as a subset of anchor TRPs can transmit cross-TRP GTS). In such cases, other TRPs can transmit a per-TRP GTS. In other cases, all of the TRPs (e.g., all TRPs 405 or all TRPs 505) may transmit a same type of GTS signal (e.g., a separate per-TRP GTS or cross-TRP GTS).

Based on the different types of GTS signals that can be transmitted by different TRPs, a number of different combinations can be implemented in a wireless communications system. In some cases, a separate per-TRP GTS may be transmitted only by an anchor TRP. In such cases, if a first TRP (e.g., an anchor TRP) transmits a GTS, the UE may turn off an antenna panel or panels associated with the first TRP. In such cases, the GTS signal may indicate the TRP either implicitly or explicitly, and optionally a GTS duration (e.g., a dynamic indication of GTS duration). In some cases, the GTS duration may be statically or semi-statically configured with a DRX configuration.

In other cases, separate per-TRP GTSs of the same type (e.g., per-TRP GTS) may be transmitted by all TRPs. Such an example may be suitable for cases where the TRPs have non-ideal backhaul connections such that the TRPs are not able to reliably exchange information on whether they have data or control information to be transmitted to a UE. In such cases, if the UE receives a per-TRP GTS signal from a TRP (e.g., a first TRP or a second TRP), the UE may turn off the antenna panel associated with the TRP from which the GTS is received. In such cases, each GTS signal may include an identifier of the TRP (e.g., a TRP index that is based on a number of configured TRP indices), and optionally a GTS duration.

In other cases, a cross-TRP GTS based on a predefined rule regarding which TRPs the GTS indicates may be transmitted by an anchor TRP (or subset of anchor TRPs). In such cases, if the UE receives a GTS from the anchor TRP, the UE may turn off all antenna panels that are identified in the predefined rule (e.g., all TRPs with which the UE communicates). In such cases, the GTS signal may include an identifier of the TRP (either implicitly or explicitly), and optionally a GTS duration.

In further cases, a cross-TRP GTS, based on a predefined rule regarding which TRPs the GTS indicates, may be transmitted by any TRP. In such cases, if the UE receives a GTS from any TRP, the UE may turn off all antenna panels that are identified in the predefined rule (e.g., all TRPs with which the UE communicates). In such cases, the GTS signal may include an identifier of the TRP (either implicitly or explicitly), and optionally a GTS duration.

In other cases, a dynamic cross-TRP GTS may be transmitted by only an anchor TRP (or subset of anchor TRPs). In such cases, if the UE receives a GTS from the anchor TRP, the UE may turn off one or more antenna panels that are identified by the cross-TRP GTS signal (e.g., all panels associated with indicated index values in the GTS signal). In such cases, the GTS signal may include an identifier of the transmitting TRP (either implicitly or explicitly), an indication of which TRPs for which the GTS applies (e.g., a subset of TRPs in an active TRP cluster that communicates with the UE), and a GTS duration (e.g., a GTS duration for each indicated TRP or a GTS duration that applies to all indicated TRPs). Such dynamic cross-TRP signaling by an anchor TRP may be used, in some cases, where backhaul links between the different TRPs is ideal or nearly ideal.

In still other cases, a dynamic cross-TRP GTS may be transmitted to the UE by any TRP. In such cases, if the UE receives a GTS, the UE may turn off one or more antenna panels that are identified by the cross-TRP GTS signal (e.g., all panels associated with indicated index values in the GTS signal). In such cases, the GTS signal may include an identifier of the transmitting TRP, an indication of which TRPs to which the GTS applies (e.g., a subset of TRPs in an active TRP cluster that communicates with the UE), and a GTS duration (e.g., a GTS duration for each indicated TRP or a GTS duration that applied to all indicated TRPs). Such dynamic cross-TRP signaling by an anchor TRP may be used, in some cases, where backhaul links between the different TRPs is ideal or nearly ideal.

In further cases, an anchor TRP may transmit a cross-TRP GTS, based on a predefined rule regarding which TRPs the GTS indicates, and non-anchor TRPs may transmit a per-TRP GTS. In such cases, if the UE receives a cross-TRP GTS from the anchor TRP, the UE may turn off all antenna panels of its associated TRPs. In the UE receives a per-TRP GTS from a non-anchor TRP, the UE may turn off the antenna panel associated with the TRP that transmitted the per-TRP GTS. In such cases, the GTS signal may include an identifier of the transmitting TRP and a GTS duration. Such cases may provide a relatively simple set of rules for GTS with relatively low signaling overhead.

In still further cases, an anchor TRP may transmit a dynamic cross-TRP GTS, and non-anchor TRPs may transmit a per-TRP GTS. In such cases, if the UE receives a cross-TRP GTS from the anchor TRP, the UE may turn off one or more antenna panels that are identified by the cross-TRP GTS signal (e.g., all panels associated with indicated index values in the GTS signal). If the UE receives a per-TRP GTS from a non-anchor TRP, the UE may turn off the antenna panel associated with the non-anchor TRP that transmitted the GTS. In such cases, the cross-GTS signal may include an identifier of the transmitting TRP, an indication of which TRPs for which the GTS applies (e.g., a subset of TRPs in an active TRP cluster that communicates with the UE), and a GTS duration (e.g., a GTS duration for each indicated TRP or a GTS duration that applied to all indicated TRPs). The per-GTS signal may include a TRP indication and a GTS duration. Such an example may be used, in some cases, when the TRPs have ideal or non-ideal backhaul, and also for the non-ideal backhaul case where the backhaul delay is relatively small (e.g., close to ideal backhaul).

Figure 6:
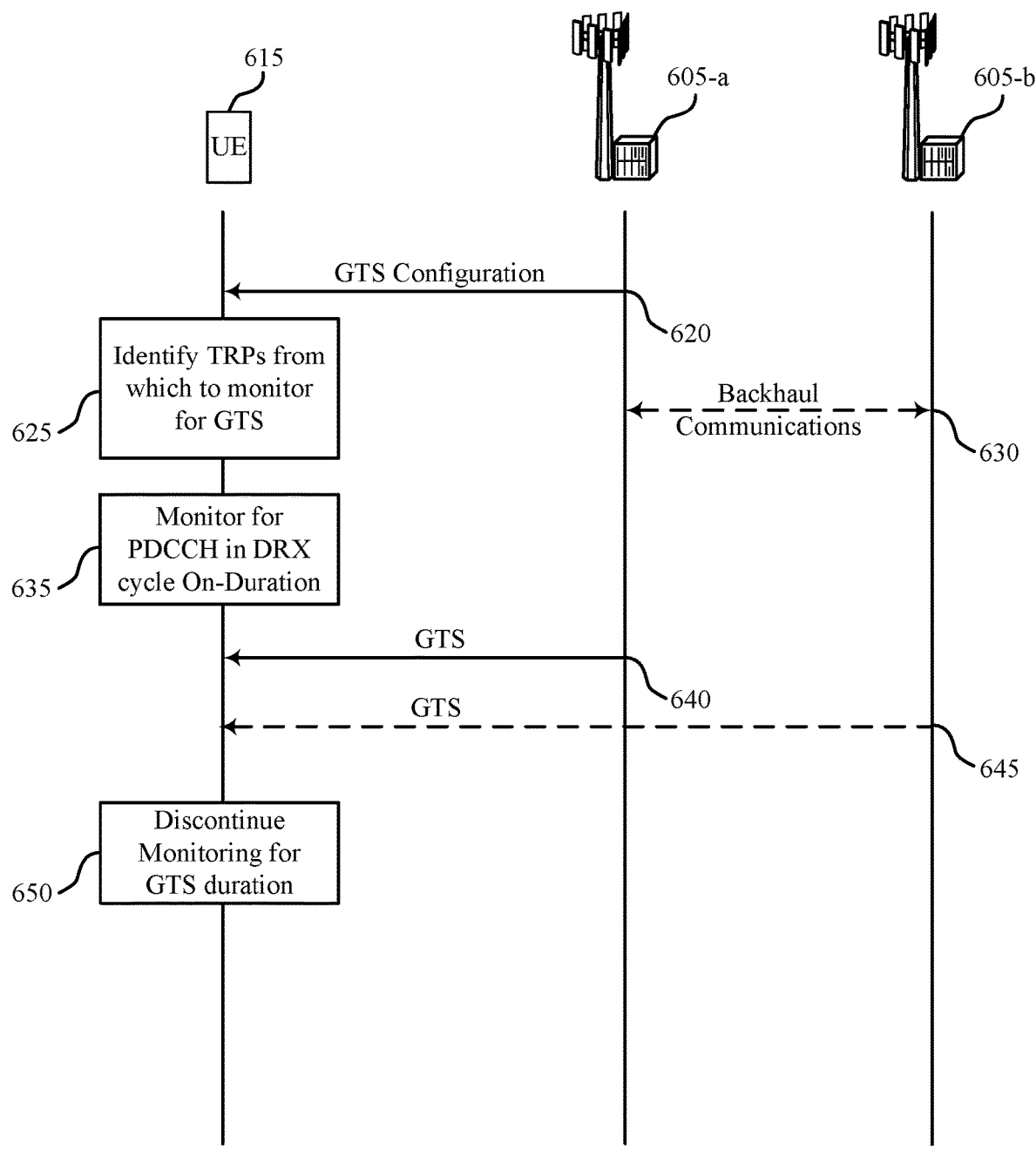
FIG. 6 illustrates an example of a process flow that supports techniques for signaling go-to-sleep for multiple transmission/reception points in accordance with various aspects of the present disclosure.

FIG. 6 illustrates an example of a process flow 600 that supports techniques for signaling go-to-sleep for multiple transmission/reception points in accordance with various aspects of the present disclosure. In some examples, process flow 600 may be implemented in aspects of wireless communications system 100. Process flow 600 illustrates aspects of techniques performed by a first base station 605-*a* and a second base station 605-*b* (collectively referred to as base stations 605), which may be examples of a base station or TRP described with reference to FIGS. 1 through 5. Process flow 600 also illustrates aspects of techniques performed by a UE 615, which may be an example of a UE described with reference to FIGS. 1 through 5. Process flow 600 may implement aspects of wireless communications systems described with reference to FIGS. 1 through 5. For example, UE 615 in process flow 600 may support efficient techniques for signaling GTS for multiple TRPs when UE 615 is configured to communicate on multiple panels with multiple TRPs (e.g., to reduce power consumption at UE 615).

At 620, the base station 605-*a* may provide a GTS configuration to the UE 615. In some cases, the GTS configuration may be provided in RRC signaling. In some cases, the GTS configuration may be provided with a DRX configuration that is provided to the UE 615. In some cases, the GTS configuration to the UE 615 may indicate a set of TRPs with which the UE 615 may communicate using multiple different antenna panels, and may indicate a whether each TRP can transmit a GTS, if so, what type of GTS (e.g., per-TRP GTS, dynamic cross-TRP GTS, or fixed cross-TRP GTS) may be transmitted. In some cases, the GTS configuration may include a number of index values that are each mapped to a TRP of the set of TRPs. In some cases, the GTS configuration may include a GTS duration that applies to any GTS that is received at the UE 615 (e.g., a semi-statically configured GTS duration). In other cases, a set of GTS duration index values may be associated with different GTS durations, and a GTS signal may indicate the GTS duration by providing an GTS duration index value from the set of GTS duration index values.

At 625, the UE 615 may identify which TRPs to monitor for GTS. Such an identification may be based on the GTS configuration. For example, the UE 615 may be configured to monitor only anchor TRPs for GTS, and the UE 615 may identify one or more anchor TRPs. In other cases, all TRPs may transmit a GTS, and the UE may identify all TRPs of the set of TRPs. In some cases, the UE 615 may also identify a type of GTS that each TRP may transmit.

At 630, the first base station 605-*a* and the second base station 605-*b* may optionally exchange backhaul information in backhaul communications. In some cases, the first base station 605-*a* and the second base station 605-*b* may have an ideal or near-ideal backhaul connection, and may exchange downlink buffer status of the UE 615 to determine whether a GTS for one or both base stations 605 should be provided to the UE 615. In other cases, the backhaul connection may be non-ideal, or the first base station 605-*a* and the second base station 605-*b* may not exchange backhaul information, in which case each base station 605 may, in some cases, transmit a separate per-TRP GTS.

At 635, the UE 615 may monitor for PDCCH (and/or PDSCH) in a DRX cycle on-duration. In some cases, the UE 615 may initiate the monitoring in accordance with DRX configuration on two or more antenna panels that are associated with different base stations 605. In some cases, the UE 615 may monitor for a wake-up signal via one or more antenna panels and turn on one or more panels based on receipt of the wake-up signal.

At 640, the first base station 605-*a* may transmit a first GTS signal. In some cases, the first GTS signal may be a cross-TRP GTS signal that indicates whether the UE 615 is to turn off one or more antenna panels associated with one or more of the first base station 605-*a* or the second base station 605-*b*. In some cases, the first GTS signal may provide an indication of one or more base stations, and may provide an associated GTS duration. The indication of the one or more base station may be an explicit indication of the index or indices of the one or more base station, or may be an implicit indication of the index or indices of the at least one base station (e.g., may indicate transmission configuration indication (TCI) state with quasi co-location (QCL) parameters corresponding to the index or indices of the at least one base station).

Optionally, at 645, the second base station 605-*b* may transmit a second GTS signal. In some cases, the second GTS signal may be a cross-TRP GTS or a per-TRP GTS, based on the GTS configuration.

At 650, the UE 615 may discontinue monitoring on one or more antenna panels based at least in part on the received GTS signal(s). In some cases, the received GTS signal(s) may be transmitted in a control message (e.g., a MAC-CE, DCI message, or RRC message) during the DRX on-duration. In some cases, the UE 615 may discontinue monitoring for the GTS duration that is indicated for each antenna panel. In some cases, the GTS duration spans less than a remaining DRX on-duration, and after expiration of the GTS duration the UE 615 may turn on the associated panels and again monitor for transmissions from the one or more base stations 605.

Figure 7:
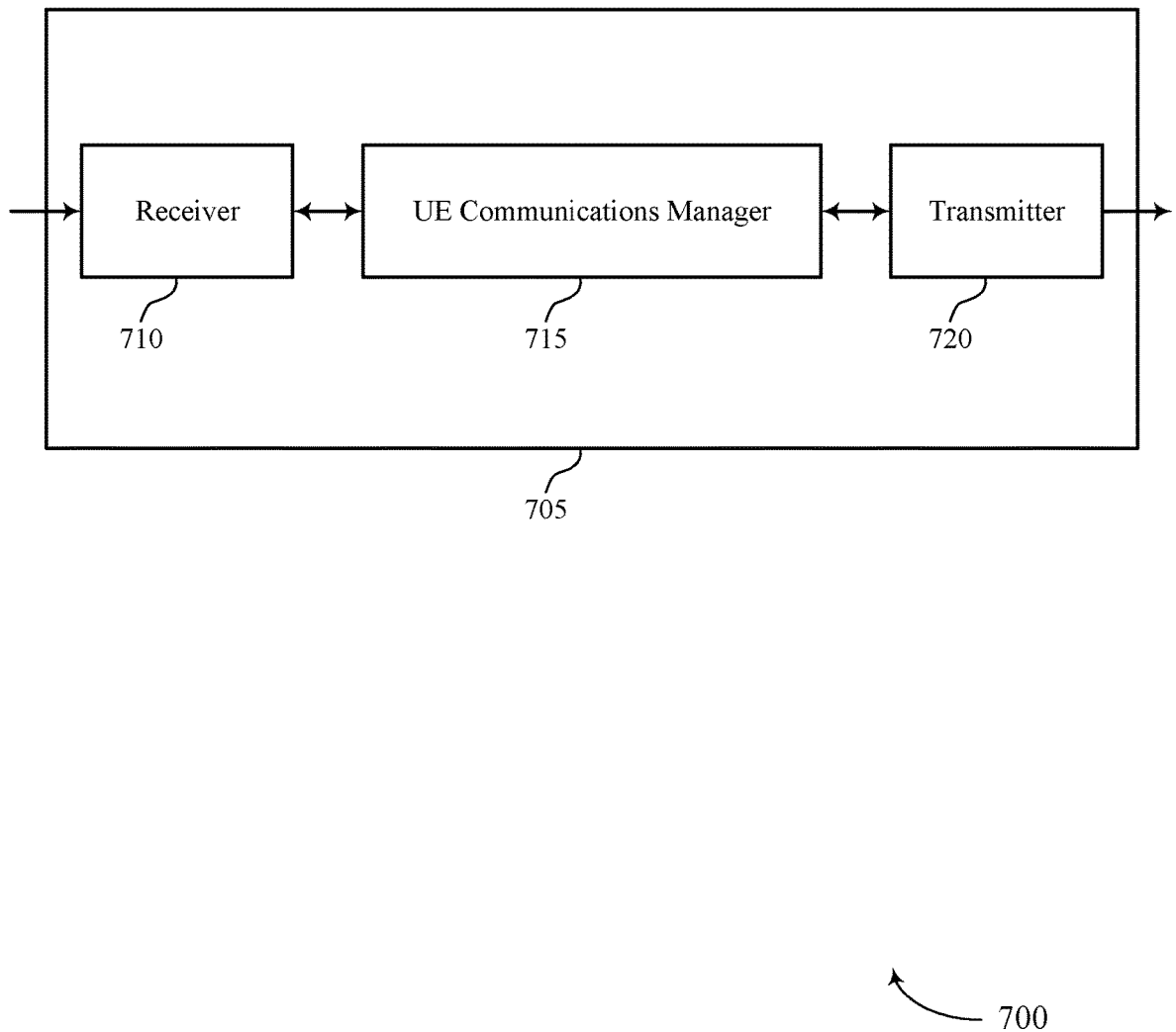
FIGS. 7 and 8 show block diagrams of devices that support techniques for signaling go-to-sleep for multiple transmission/reception points in accordance with various aspects of the present disclosure.

FIG. 7 shows a block diagram 700 of a device 705 that supports techniques for signaling go-to-sleep for multiple transmission/reception points in accordance with various aspects of the present disclosure. The device 705 may be an example of aspects of a UE as described herein with respect to FIGS. 1 through 6, 8 through 10, and 14. The device 705 may include a receiver 710, a UE communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information from GTS signals related to multiple TRPs, etc.). Information may be passed on to other components of the device 705. The receiver 710 may be an example of aspects of the transceiver 1020 described with reference to FIG. 10. The receiver 710 may utilize a single antenna or a set of antennas.

The UE communications manager 715 may monitor control channel transmissions from a set of transmission/reception points for an on-duration of a discontinuous reception cycle, receive, from at least a first transmission/reception point of the set of transmission/reception points, a go-to-sleep signal that indicates the device 705 is to discontinue the monitoring for the control channel transmissions from at least a second transmission/reception point of the set of transmission/reception points, and discontinue, responsive to the receiving, the monitoring for the control channel transmissions from at least the second transmission/reception point of the set of transmission/reception points. The UE communications manager 715 may be an example of aspects of the UE communications manager 1045 described herein.

The UE communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a field programmable gate array (FPGA) or other programmable logic device (PLD), discrete gate or transistor logic, discrete hardware components, or any combination thereof designed to perform the functions described in the present disclosure.

The UE communications manager 715, or its sub-components, may be physically located at various positions, including being distributed such that portions of functions are implemented at different physical locations by one or more physical components. In some examples, the UE communications manager 715, or its sub-components, may be a separate and distinct component in accordance with various aspects of the present disclosure. In some examples, the UE communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver. For example, the transmitter 720 may be an example of aspects of the transceiver 1020 described with reference to FIG. 10. The transmitter 720 may utilize a single antenna or a set of antennas.

Figure 8:
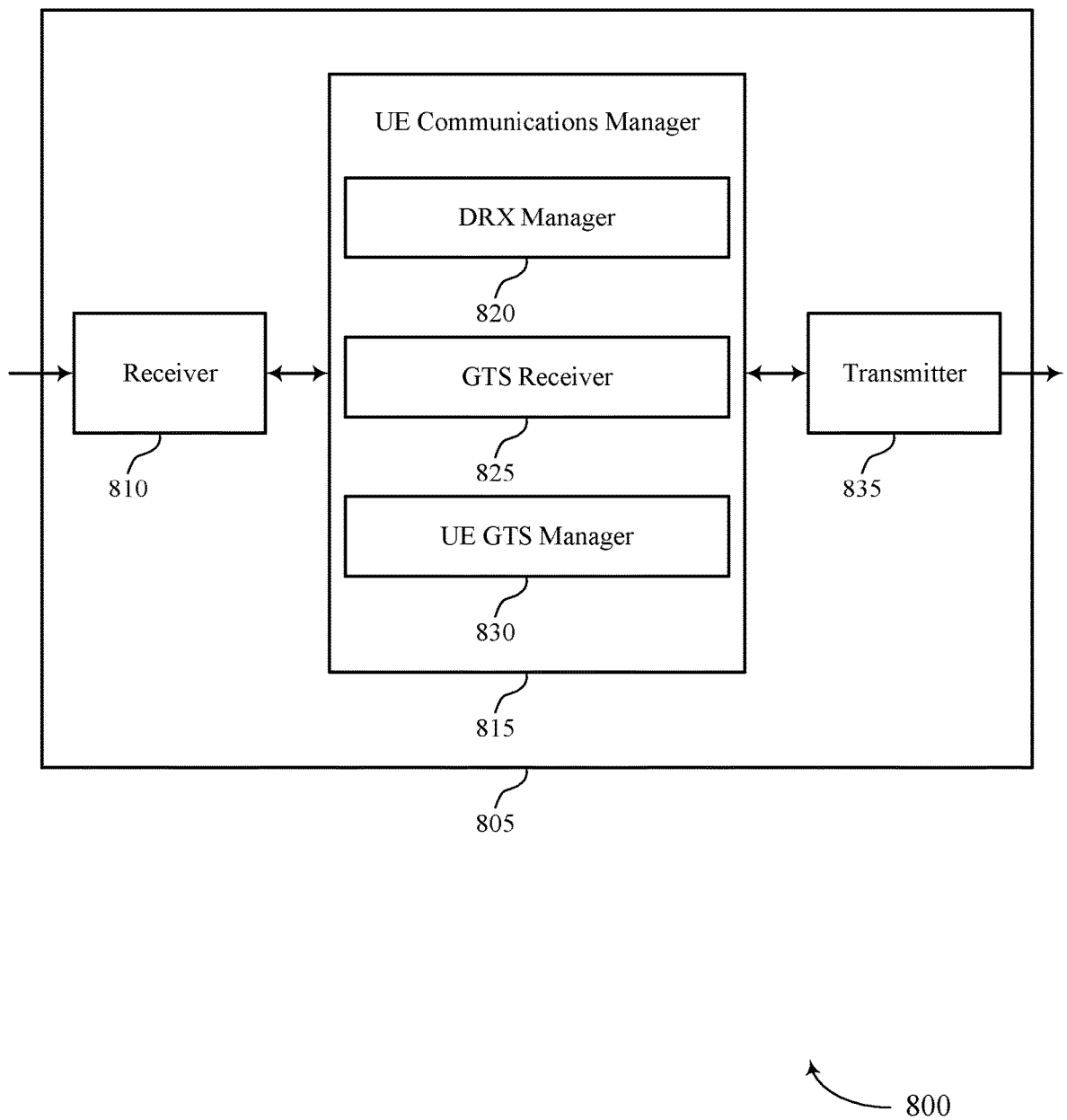

FIG. 8 shows a block diagram 800 of a device 805 that supports techniques for signaling go-to-sleep for multiple transmission/reception points in accordance with various aspects of the present disclosure. The device 805 may be an example of aspects of a device 705, or a UE as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information from GTS signals related to multiple TRPs, etc.). Information may be passed on to other components of the device 805. The receiver 810 may be an example of aspects of the transceiver 1020 described with reference to FIG. 10. The receiver 810 may utilize a single antenna or a set of antennas.

The UE communications manager 815 may be an example of aspects of the UE communications manager 715 as described herein. The UE communications manager 815 may include a DRX manager 820, a GTS receiver 825, and a UE GTS manager 830. The communications manager 815 may be an example of aspects of the UE communications manager 1045 described herein.

The DRX manager 820 may monitor control channel transmissions from a set of transmission/reception points for an on-duration of a discontinuous reception cycle.

The GTS receiver 825 may receive, from at least a first transmission/reception point of the set of transmission/reception points, a go-to-sleep signal that indicates the UE is to discontinue the monitoring for the control channel transmissions from at least a second transmission/reception point of the set of transmission/reception points.

The UE GTS manager 830 may maintain or discontinue, based on receipt of the go-to-sleep signal, the monitoring for the control channel transmissions from at least the second transmission/reception point of the set of transmission/reception points.

The transmitter 835 may transmit signals generated by other components of the device 805. In some examples, the transmitter 835 may be collocated with a receiver 810 in a transceiver. For example, the transmitter 835 may be an example of aspects of the transceiver 1020 described with reference to FIG. 10. The transmitter 835 may utilize a single antenna or a set of antennas.

Figure 9:
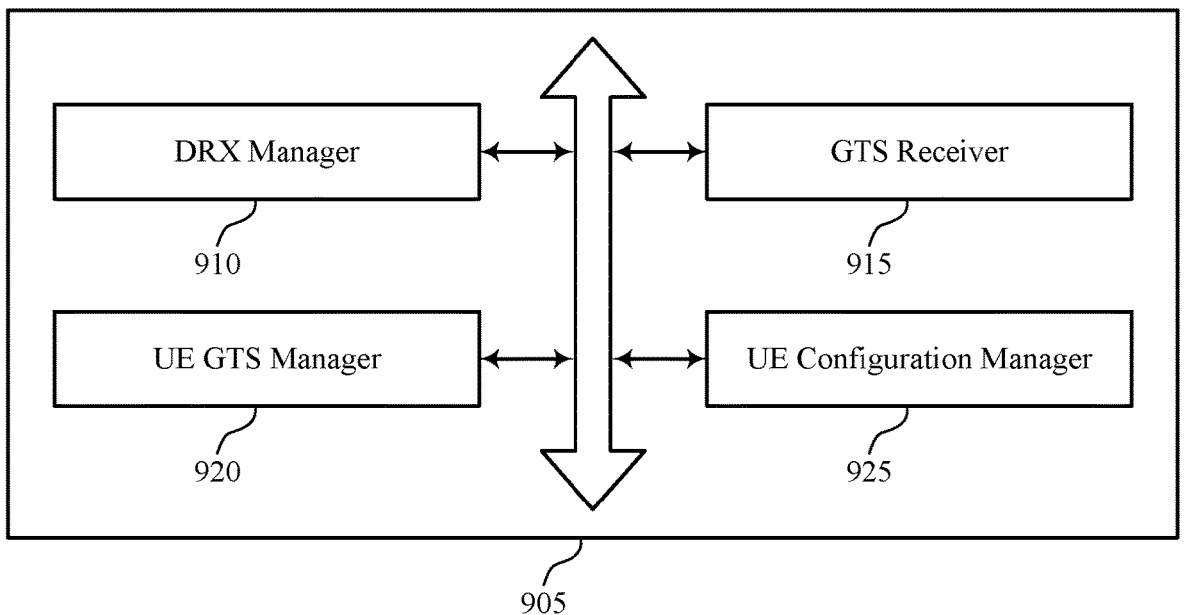
FIG. 9 shows a block diagram of a communications manager that supports techniques for signaling go-to-sleep for multiple transmission/reception points in accordance with various aspects of the present disclosure.

FIG. 9 shows a block diagram 900 of a UE communications manager 905 that supports techniques for signaling go-to-sleep for multiple transmission/reception points in accordance with various aspects of the present disclosure. The UE communications manager 905 may be an example of aspects of a UE communications manager 715, a UE communications manager 815, or a UE communications manager 1045 described herein. The UE communications manager 905 may include a DRX manager 910, a GTS receiver 915, a UE GTS manager 920, and a UE configuration manager 925. Each of these components may communicate, directly or indirectly, with one another (e.g., via one or more buses).

The DRX manager 910 may monitor control channel transmissions from a set of transmission/reception points for an on-duration of a discontinuous reception cycle. For example, the DRX manager may receive a DRX configuration and determine an on-duration for monitoring for transmissions on two or more antenna panels based on the DRX configuration. In some cases, the DRX manager may identify that a wake-up signal is received and initiate monitoring on two or more antenna panels based on the wake-up signal.

The GTS receiver 915 may receive, from at least a first transmission/reception point of the set of transmission/reception points, a go-to-sleep signal that indicates the UE is to discontinue the monitoring for the control channel transmissions from at least a second transmission/reception point of the set of transmission/reception points. In some examples, the GTS receiver 915 may receive separate go-to-sleep signals from two or more transmission/reception points of the set of transmission/reception points. In some examples, the discontinuing includes discontinuing the monitoring for the control channel transmissions from each of the two or more first transmission/reception points based on the respective go-to-sleep signal.

In some examples, the GTS receiver 915 may receive a cross-transmission/reception point go-to-sleep signal from the first transmission/reception point of the set of transmission/reception points that indicates the UE is to discontinue the monitoring for the control channel transmissions from one or more of the first transmission/reception point or a second transmission/reception point of the set transmission/reception points.

In some examples, the GTS receiver 915 may monitor for the go-to-sleep signal from a subset of transmission/reception points (e.g., one or more anchor transmission/reception points). In some examples, the GTS receiver 915 may receive the cross-transmission/reception point go-to-sleep signal from an anchor transmission/reception point. In some examples, the GTS receiver 915 may receive the go-to-sleep signal from a first non-anchor transmission/reception point.

In some cases, at least a first go-to-sleep signal and a second go-to-sleep signal of the separate go-to-sleep signals are independent of each other, and where the second go-to-sleep signal is received before, concurrently with, or after, the first go-to-sleep signal. In some cases, the go-to-sleep signal is received in one or more of a medium access control element, a downlink control information message, or a radio resource control message.

The UE GTS manager 920 may discontinue, responsive to the receiving the GTS signal, the monitoring for the control channel transmissions from at least the second transmission/reception point of the set of transmission/reception points. In some examples, the discontinuing includes discontinuing the monitoring for the control channel transmissions from the one or more of the first transmission/reception point or the second transmission/reception point that are indicated in a cross-transmission/reception point go-to-sleep signal. In some examples, the UE GTS manager 920 may deactivate one or more antenna panels at the UE associated with one or more transmission/reception points indicated in the cross-transmission/reception point go-to-sleep signal.

In some cases, the cross-transmission/reception point go-to-sleep signal indicates a subset of transmission/reception points of the set of transmission/reception points for which the UE is to discontinue the monitoring for the control channel transmissions. In some cases, the cross-transmission/reception point go-to-sleep signal provides explicit indication of indices of the subset of transmission/reception points or an indication of transmission configuration indication states corresponding to the indices of the subset of transmission/reception points, and where the UE discontinues monitoring for the control channel transmissions from each transmission/reception point indicated by the indices.

In some cases, the cross-transmission/reception point go-to-sleep signal further indicates a go-to-sleep duration for each transmission/reception point of the subset of transmission/reception points, and where the UE discontinues monitoring for the control channel transmissions from each of the subset of transmission/reception points for a time duration corresponding to the indicated go-to-sleep duration of each transmission/reception point of the subset of transmission/reception points.

In some cases, the cross-transmission/reception point go-to-sleep signal indicates that the UE is to discontinue the monitoring for the control channel transmissions from all of the set of transmission/reception points. In some cases, the discontinuing the monitoring for the control channel transmissions includes deactivating one or more antenna panels at the UE associated with one or more transmission/reception points of the set of transmission/reception points.

The UE configuration manager 925 may receive a go-to-sleep configuration that indicates a subset of transmission/reception points that can transmit go-to-sleep signals. In some cases, the subset of transmission/reception points include only anchor transmission/reception points of the set of transmission/reception points. In some cases, the go-to-sleep configuration indicates that an anchor transmission/reception point of the set of transmission/reception points can transmit a cross-transmission/reception point go-to-sleep signal, and that non-anchor transmission/reception points can transmit go-to-sleep signals only for the associated non-anchor transmission/reception point. In some cases, the go-to-sleep configuration is received in a radio resource control message from the anchor transmission/reception point.

Figure 10:
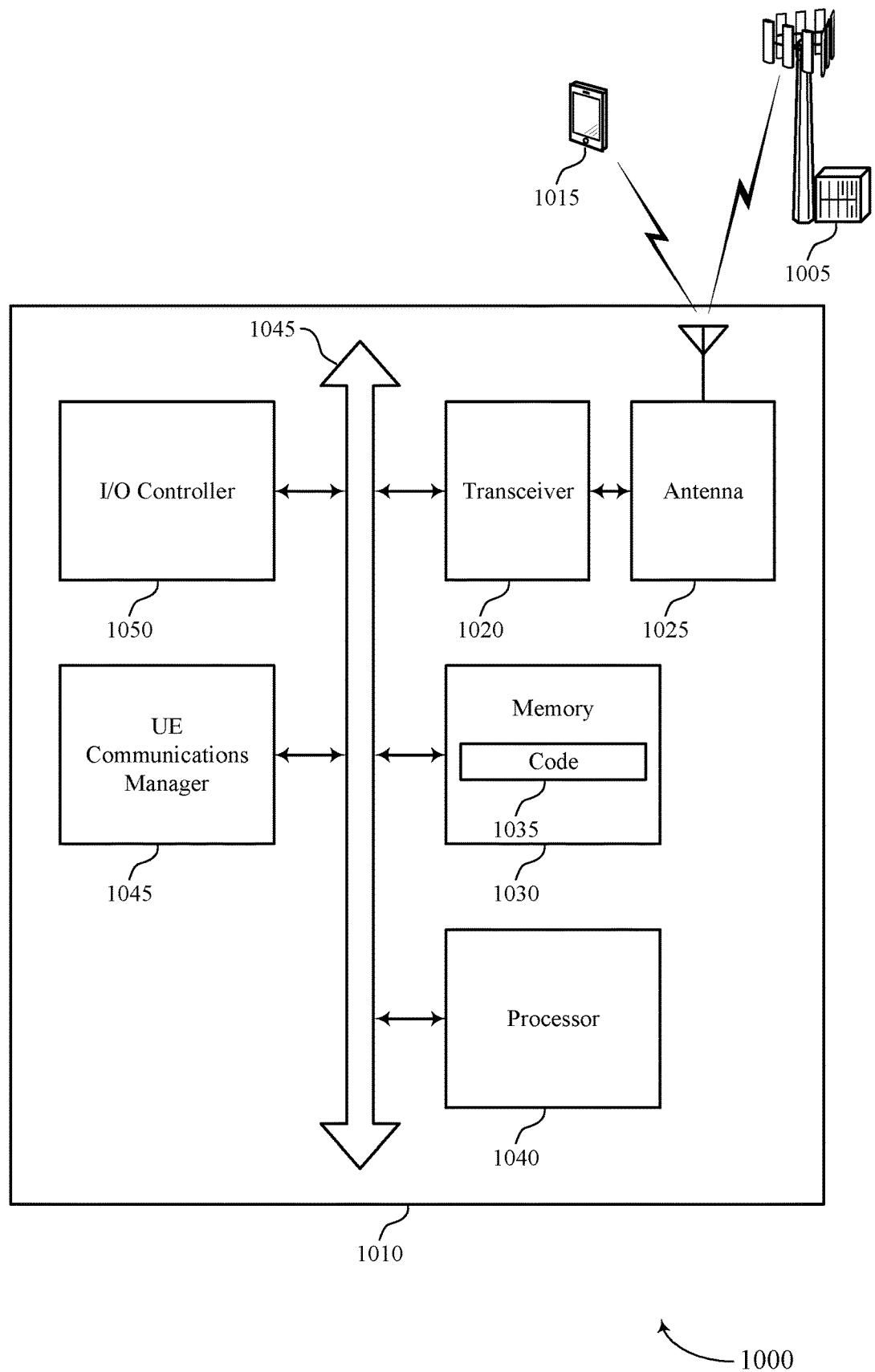
FIG. 10 shows a diagram of a system including a device that supports techniques for signaling go-to-sleep for multiple transmission/reception points in accordance with various aspects of the present disclosure.

FIG. 10 shows a diagram of a system 1000 including a device 12351010 that supports techniques for signaling go-to-sleep for multiple transmission/reception points in accordance with various aspects of the present disclosure. The device 1010 may be an example of or include the components of device 705, device 805, or a UE as described herein. The device 1010 may include components for bi-directional voice and data communications including components for transmitting and receiving communications, including a UE communications manager 1045, an I/O controller 1050, a transceiver 1020, an antenna 1025, memory 1030, and a processor 1040. These components may be in electronic communication via one or more buses (e.g., bus 1045). The device 1010 may be capable of wireless communication with at least a base station 1005 and a UE 1015.

The UE communications manager 1045 may monitor control channel transmissions from a set of transmission/reception points for an on-duration of a discontinuous reception cycle, receive, from at least a first transmission/reception point of the set of transmission/reception points, a go-to-sleep signal that indicates the UE is to discontinue the monitoring for the control channel transmissions from at least a second transmission/reception point of the set of transmission/reception points, and discontinue, responsive to the receiving, the monitoring for the control channel transmissions from at least the second transmission/reception point of the set of transmission/reception points.

The I/O controller 1050 may manage input and output signals for the device 1010. The I/O controller 1050 may also manage peripherals not integrated into the device 1010. In some cases, the I/O controller 1050 may represent a physical connection or port to an external peripheral. In some cases, the I/O controller 1050 may utilize an operating system such as iOS®, ANDROID®, MS-DOS®, MS-WINDOWS®, OS/2®, UNIX®, LINUX®, or another known operating system. In other cases, the I/O controller 1050 may represent or interact with a modem, a keyboard, a mouse, a touchscreen, or a similar device. In some cases, the I/O controller 1050 may be implemented as part of a processor. In some cases, a user may interact with the device 1010 via the I/O controller 1050 or via hardware components controlled by the I/O controller 1050.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the device 1010 may include a single antenna 1025. However, in some cases the device 1010 may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1010 to perform various functions (e.g., functions or tasks supporting techniques for signaling go-to-sleep for multiple transmission/reception points).

The code 1035 may include instructions to implement aspects of the present disclosure, including instructions to support wireless communications, such as described, for example, with reference to FIGS. 15-19. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
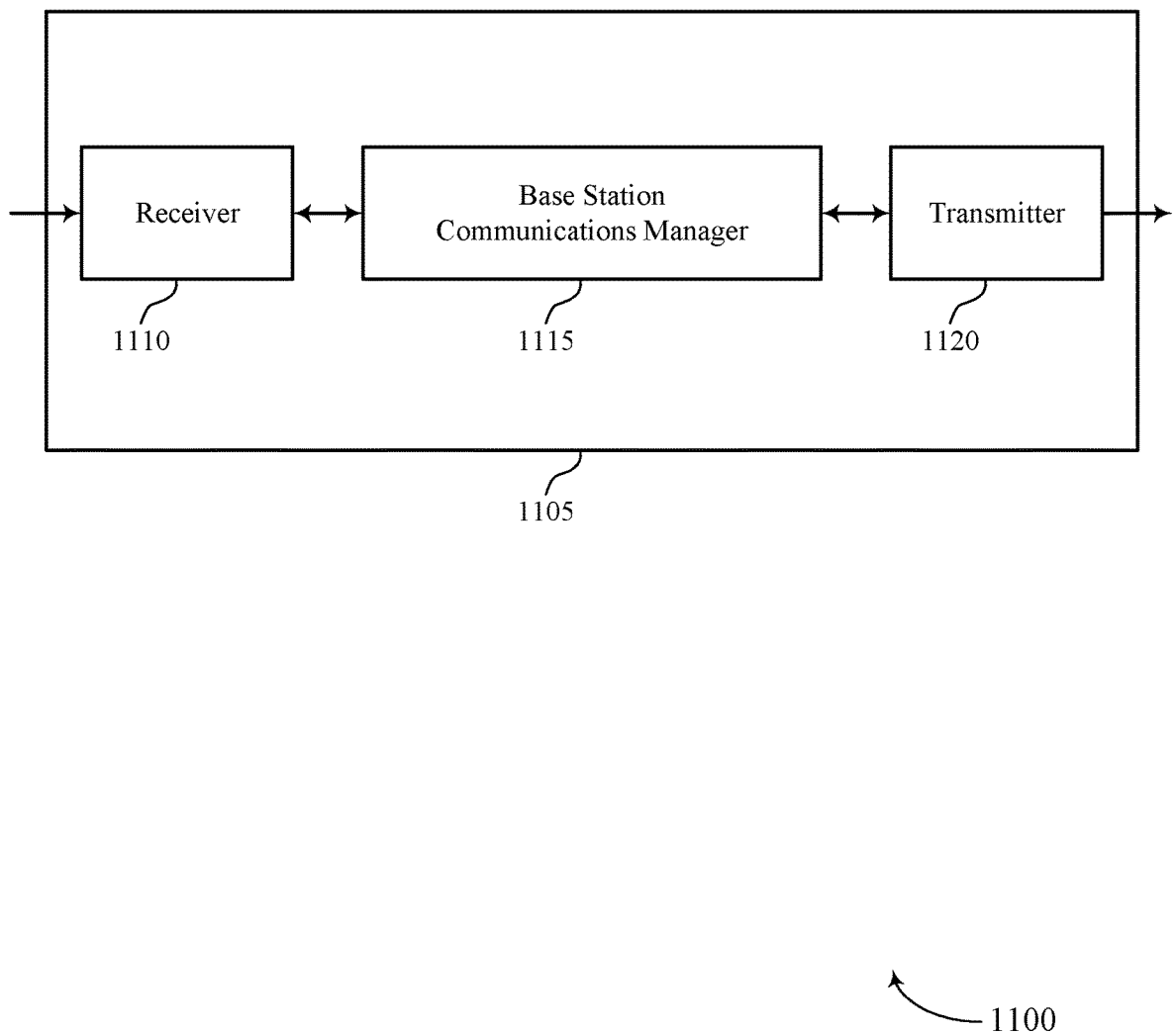
FIGS. 11 and 12 show block diagrams of devices that support techniques for signaling go-to-sleep for multiple transmission/reception points in accordance with various aspects of the present disclosure.

FIG. 11 shows a block diagram 1100 of a device 1105 that supports techniques for signaling go-to-sleep for multiple transmission/reception points in accordance with various aspects of the present disclosure. The device 1105 may be an example of aspects of a base station as described herein with respect to FIGS. 1 through 6, 10, and 12 through 14. The device 1105 may include a receiver 1110, a base station communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to signaling go-to-sleep for multiple transmission/reception points, etc.). Information may be passed on to other components of the device 1105. The receiver 1110 may be an example of aspects of the transceiver 1420 described with reference to FIG. 14. The receiver 1110 may utilize a single antenna or a set of antennas.

The base station communications manager 1115 may determine that one or more transmission/reception points of a set of transmission/reception points have insufficient control information or data for a transmission to a UE during an on-duration of a discontinuous reception cycle and transmit one or more go-to-sleep indications to the UE that identify the determined one or more transmission/reception points of the set of transmission/reception points for which the UE is to discontinue monitoring for control channel transmissions.

The base station communications manager 1115 may also transmit a go-to-sleep configuration to a UE, the go-to-sleep configuration indicating one or more of a set of transmission/reception points from which the UE is to monitor for go-to-sleep signals, identify one or more of the set of transmission/reception points that have insufficient control information or data for a transmission to the UE during an on-duration of a discontinuous reception cycle, and transmit at least one go-to-sleep signal to the UE prior to or during the on-duration state in the discontinuous reception cycle via at least a first transmission/reception point of the indicated one or more of the set of transmission/reception points, the at least one go-to-sleep signal indicating that the UE is to discontinue monitoring for transmissions of the identified one or more transmission/reception points during the on-duration of the discontinuous reception cycle. The base station communications manager 1115 may be an example of aspects of the base station communications manager 1410 described herein.

The base station communications manager 1115, or its sub-components, may be implemented in hardware, code (e.g., software or firmware) executed by a processor, or any combination thereof. If implemented in code executed by a processor, the functions of the base station communications manager 1115, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The base station communications manager 1115, or its sub-components, may be physically located at various positions, including being distributed such that portions of functions are implemented at different physical locations by one or more physical components. In some examples, the base station communications manager 1115, or its sub-components, may be a separate and distinct component in accordance with various aspects of the present disclosure. In some examples, the base station communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver. For example, the transmitter 1120 may be an example of aspects of the transceiver 1420 described with reference to FIG. 14. The transmitter 1120 may utilize a single antenna or a set of antennas.

Figure 12:
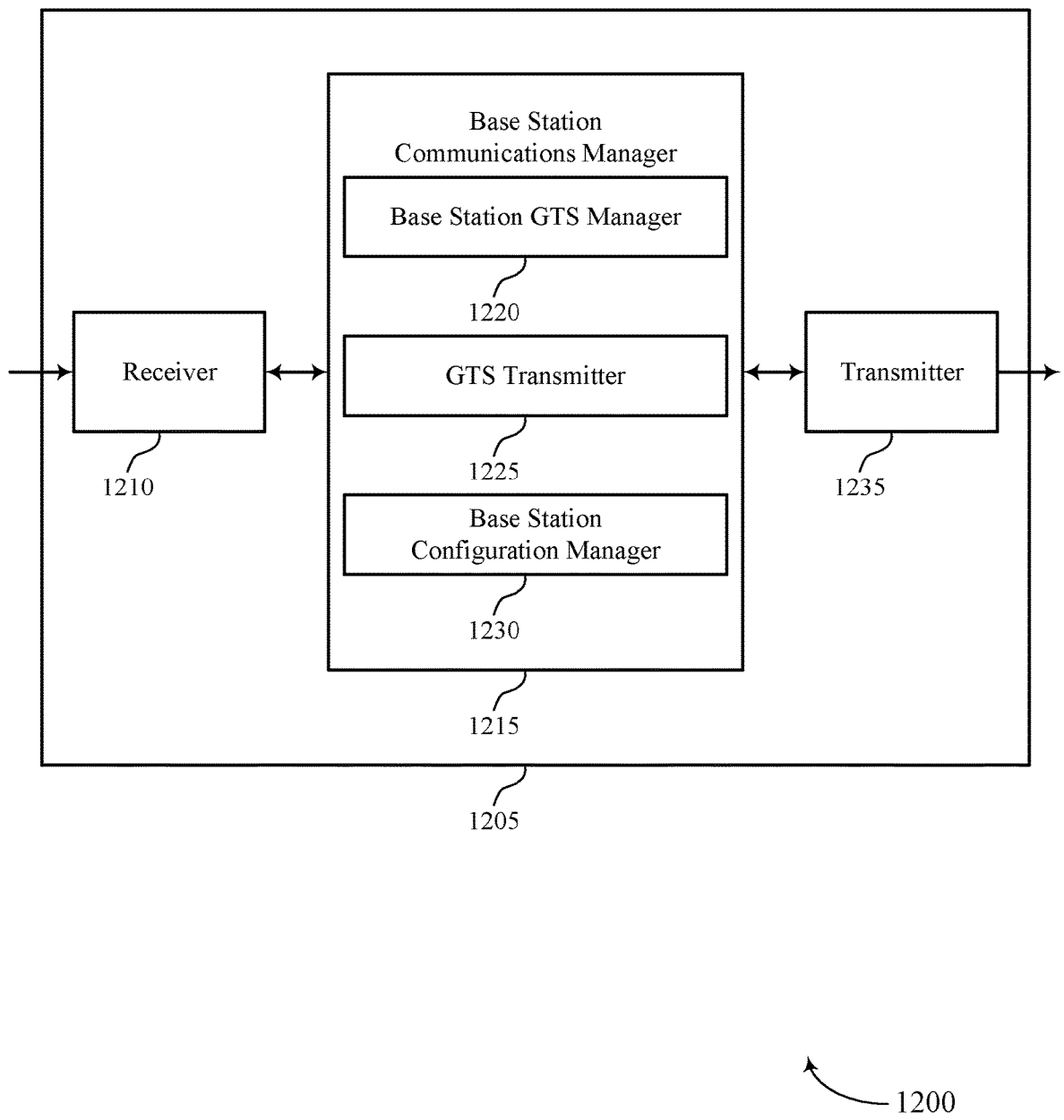

FIG. 12 shows a block diagram 1200 of a device 1205 that supports techniques for signaling go-to-sleep for multiple transmission/reception points in accordance with various aspects of the present disclosure. The device 1205 may be an example of aspects of a device 1105, or a base station as described herein with respect to FIGS. 1 through 6, 10, 11, 13, and 14. The device 1205 may include a receiver 1210, a base station communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to signaling go-to-sleep for multiple transmission/reception points, etc.). Information may be passed on to other components of the device 1205. The receiver 1210 may be an example of aspects of the transceiver 1420 described with reference to FIG. 14. The receiver 1210 may utilize a single antenna or a set of antennas.

The base station communications manager 1215 may be an example of aspects of the communications manager 1115 as described herein. The base station communications manager 1215 may include a base station GTS manager 1220, a GTS transmitter 1225, and a base station configuration manager 1230. The base station communications manager 1215 may be an example of aspects of the base station communications manager 1410 described herein.

The base station GTS manager 1220 may determine that one or more transmission/reception points of a set of transmission/reception points have insufficient control information or data for a transmission to a UE during an on-duration of a discontinuous reception cycle.

The GTS transmitter 1225 may transmit one or more go-to-sleep indications to the UE that identify the determined one or more transmission/reception points of the set of transmission/reception points for which the UE is to discontinue monitoring for control channel transmissions. In some cases, the GTS transmitter 1225 may transmit at least one go-to-sleep signal to the UE prior to or during the on-duration state in the discontinuous reception cycle via at least a first transmission/reception point of the indicated one or more of the set of transmission/reception points, the at least one go-to-sleep signal indicating that the UE is to discontinue monitoring for transmissions of the identified one or more transmission/reception points during the on-duration of the discontinuous reception cycle.

The base station configuration manager 1230 may transmit a go-to-sleep configuration to a UE, the go-to-sleep configuration indicating one or more of a set of transmission/reception points from which the UE is to monitor for go-to-sleep signals.

The transmitter 1235 may transmit signals generated by other components of the device 1205. For example, the transmitter 1235 may transmit a go-to-sleep signal to a UE. In some examples, the transmitter 1235 may be collocated with a receiver 1210 in a transceiver. For example, the transmitter 1235 may be an example of aspects of the transceiver 1420 described with reference to FIG. 14. The transmitter 1235 may utilize a single antenna or a set of antennas.

Figure 13:
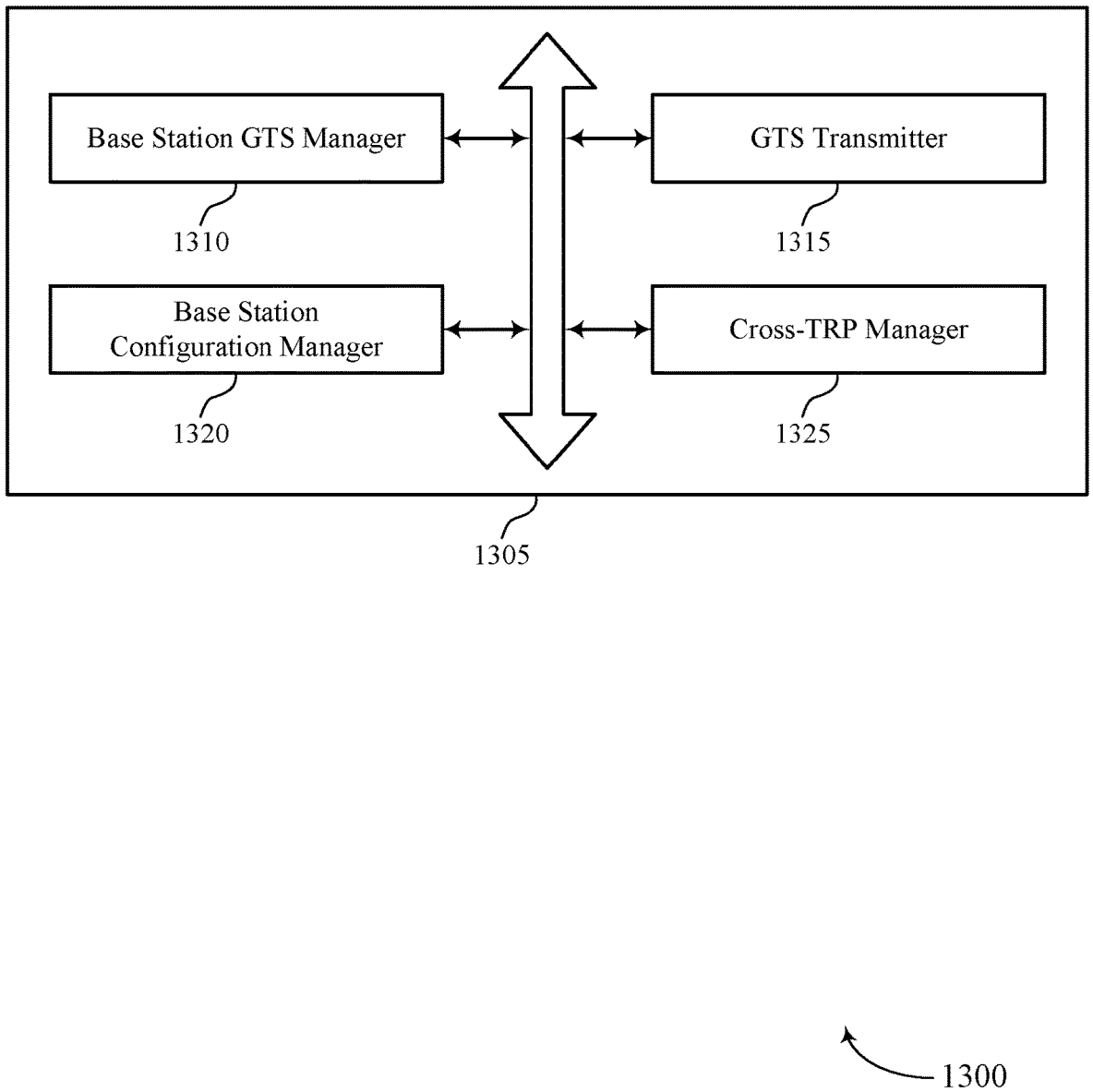
FIG. 13 shows a block diagram of a communications manager that supports techniques for signaling go-to-sleep for multiple transmission/reception points in accordance with various aspects of the present disclosure.

FIG. 13 shows a block diagram 1300 of a base station communications manager 1305 that supports techniques for signaling go-to-sleep for multiple transmission/reception points in accordance with various aspects of the present disclosure. The base station communications manager 1305 may be an example of aspects of a base station communications manager 1115, a base station communications manager 1215, or a base station communications manager 1410 described herein. The base station communications manager 1305 may include a base station GTS manager 1310, a GTS transmitter 1315, a base station configuration manager 1320, and a cross-TRP manager 1325. Each of these components may communicate, directly or indirectly, with one another (e.g., via one or more buses).

The base station GTS manager 1310 may determine that one or more transmission/reception points of a set of transmission/reception points have insufficient control information or data for a transmission to a UE during an on-duration of a discontinuous reception cycle. In some cases, each transmission/reception point of the set of transmission/reception points transmits a separate go-to-sleep signal to the UE independently of whether other transmission/reception points of the set of transmission/reception points transmits the go-to-sleep signal.

In some cases, the go-to-sleep signal is a cross-transmission/reception point go-to-sleep signal that indicates a subset of transmission/reception points of the set of transmission/reception points for which the UE is to discontinue the monitoring for the control channel transmissions. In some cases, the cross-transmission/reception point go-to-sleep signal provides an explicit indication of indices of the subset of transmission/reception points or an indication of transmission configuration indication states corresponding to the indices of the subset of transmission/reception points. In some cases, the cross-transmission/reception point go-to-sleep signal further indicates a go-to-sleep duration for each transmission/reception point of the subset of transmission/reception points.

The GTS transmitter 1315 may transmit one or more go-to-sleep indications to the UE that identify the determined one or more transmission/reception points of the set of transmission/reception points for which the UE is to discontinue monitoring for control channel transmissions. In some examples, the GTS transmitter 1315 may transmit at least one go-to-sleep signal to the UE prior to or during the on-duration state in the discontinuous reception cycle via at least a first transmission/reception point of the indicated one or more of the set of transmission/reception points, the at least one go-to-sleep signal indicating that the UE is to discontinue monitoring for transmissions of the identified one or more transmission/reception points during the on-duration of the discontinuous reception cycle. In some cases, the at least one go-to-sleep signal is transmitted in one or more of a medium access control element, a downlink control information message, or a radio resource control message.

The base station configuration manager 1320 may transmit a go-to-sleep configuration to a UE, the go-to-sleep configuration indicating one or more of a set of transmission/reception points from which the UE is to monitor for go-to-sleep signals. In some cases, the go-to-sleep configuration indicates that an anchor transmission/reception point of the set of transmission/reception points can transmit a cross-transmission/reception point go-to-sleep signal, and that non-anchor transmission/reception points can transmit a go-to-sleep signal only for the associated non-anchor transmission/reception point. In some cases, the go-to-sleep configuration is transmitted in a radio resource control message to the UE.

In some cases, the go-to-sleep configuration further indicates that the UE is to discontinue the monitoring for the control channel transmissions from all of the set of transmission/reception points responsive to a go-to-sleep signal from an anchor transmission/reception point.

The cross-TRP manager 1325 may configure one or more cross-TRP go-to-sleep signals. In some cases, the at least one go-to-sleep signal is a cross-transmission/reception point go-to-sleep signal indicates a subset of transmission/ reception points of the set of transmission/reception points for which the UE is to discontinue the monitoring for the control channel transmissions. In some cases, the cross-transmission/reception point go-to-sleep signal provides explicit indication of indices of the subset of transmission/reception points or an indication of transmission configuration indication states corresponding to the indices of the subset of transmission/reception points. In some cases, the cross-transmission/reception point go-to-sleep signal further indicates a go-to-sleep duration for each transmission/reception point of the subset of transmission/reception points.

Figure 14:
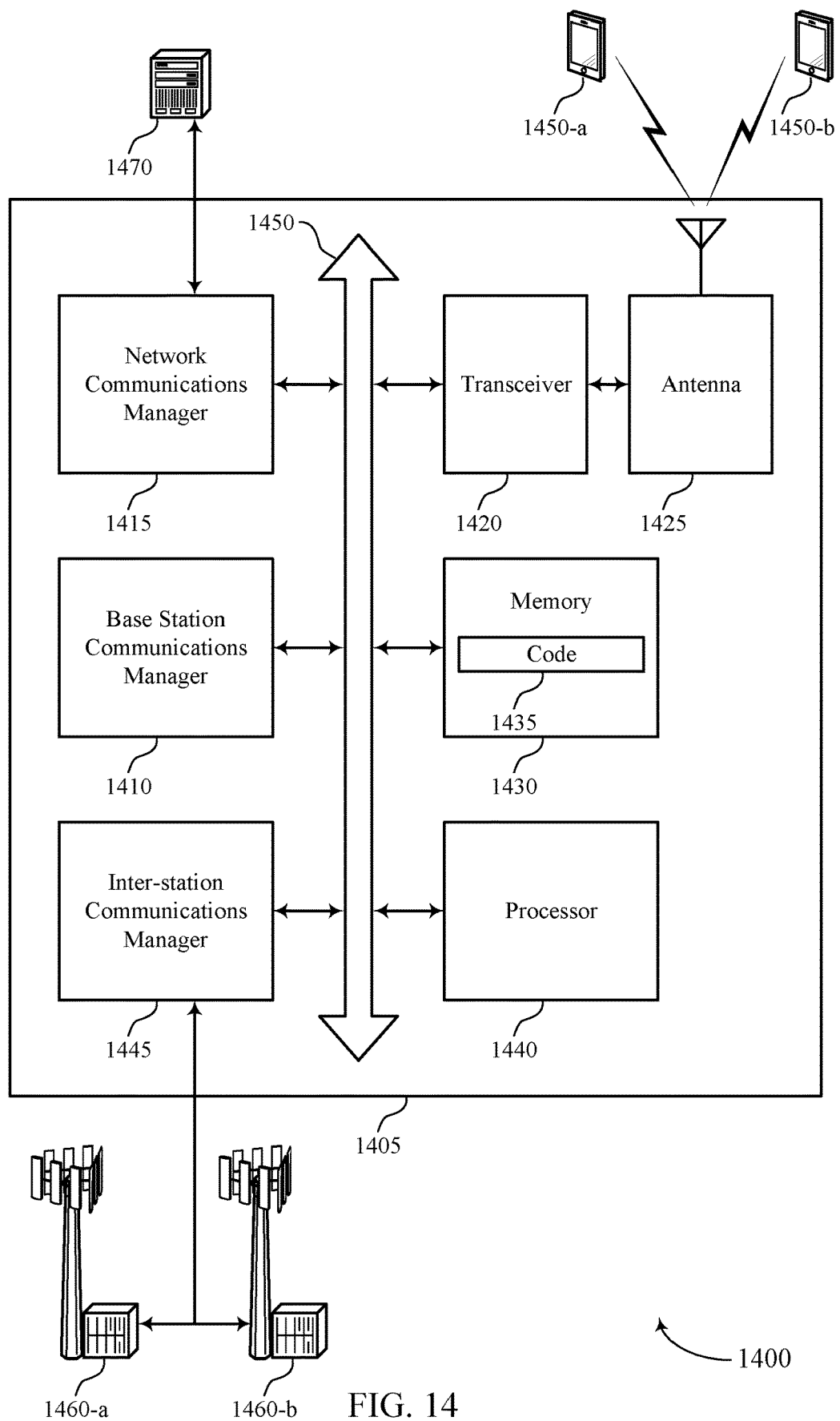
FIG. 14 shows a diagram of a system including a device that supports techniques for signaling go-to-sleep for multiple transmission/reception points in accordance with various aspects of the present disclosure.

FIG. 14 shows a diagram of a system 1400 including a device 1405 that supports techniques for signaling go-to-sleep for multiple transmission/reception points in accordance with various aspects of the present disclosure. The device 1405 may be an example of or include the components of device 1105, device 1205, or a base station as described herein. The device 1405 may include components for bi-directional voice and data communications including components for transmitting and receiving communications, including a base station communications manager 1410, a network communications manager 1415, a transceiver 1420, an antenna 1425, memory 1430, a processor 1440, and an inter-station communications manager 1445. These components may be in electronic communication via one or more buses (e.g., bus 1450). The device 1405 may be capable of wireless communication with at least a base station 1460-a, a base station 1460-b, a UE 1450-a, a UE 1450-b, and a core network 1470.

The base station communications manager 1410 may determine that one or more transmission/reception points of a set of transmission/reception points have insufficient control information or data for a transmission to a UE during an on-duration of a discontinuous reception cycle and transmit one or more go-to-sleep indications to the UE that identify the determined one or more transmission/reception points of the set of transmission/reception points for which the UE is to discontinue monitoring for control channel transmissions.

The base station communications manager 1410 may also transmit a go-to-sleep configuration to a UE, the go-to-sleep configuration indicating one or more of a set of transmission/reception points from which the UE is to monitor for go-to-sleep signals, identify one or more of the set of transmission/reception points that have insufficient control information or data for a transmission to the UE during an on-duration of a discontinuous reception cycle, and transmit at least one go-to-sleep signal to the UE prior to or during the on-duration state in the discontinuous reception cycle via at least a first transmission/reception point of the indicated one or more of the set of transmission/reception points, the at least one go-to-sleep signal indicating that the UE is to discontinue monitoring for transmissions of the identified one or more transmission/reception points during the on-duration of the discontinuous reception cycle.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein such as described, for example, with reference to FIGS. 20-21. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting techniques for signaling go-to-sleep for multiple transmission/reception points).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

Figure 20:
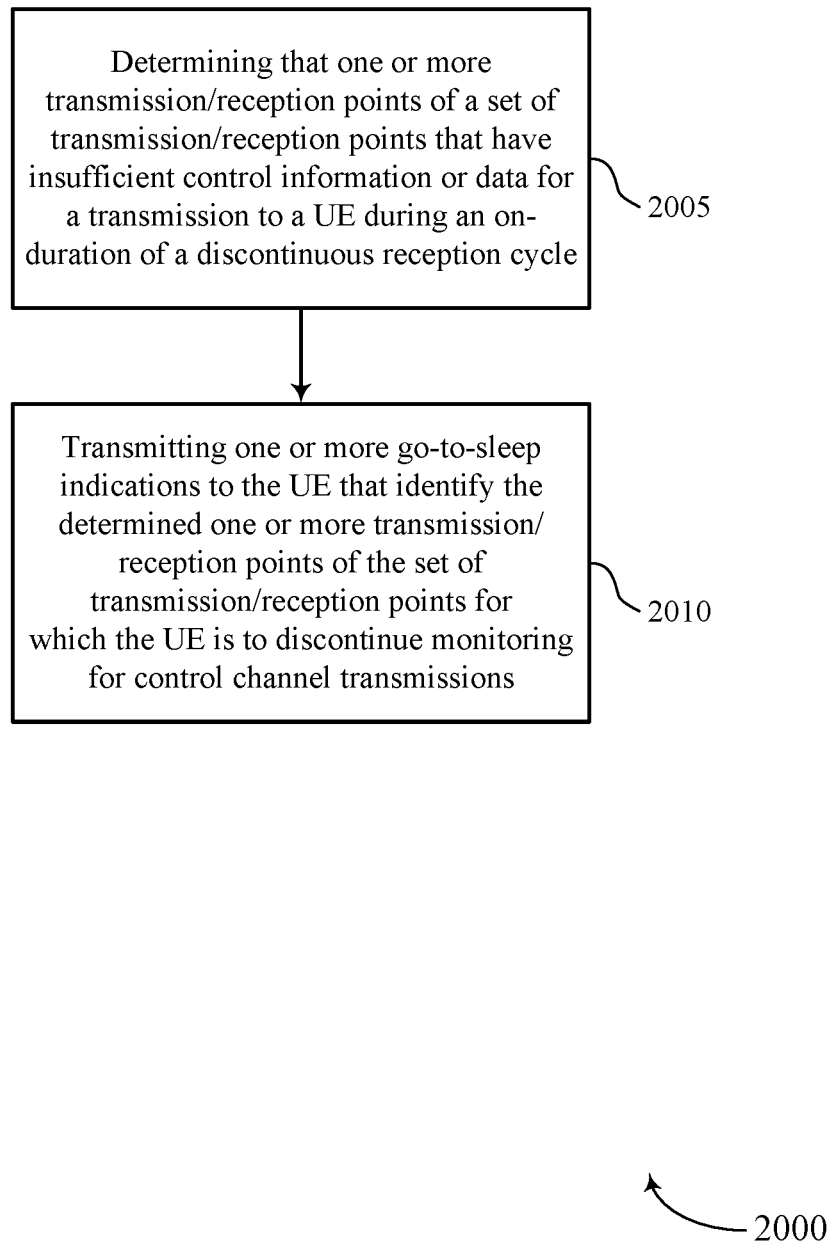
Figure 21:
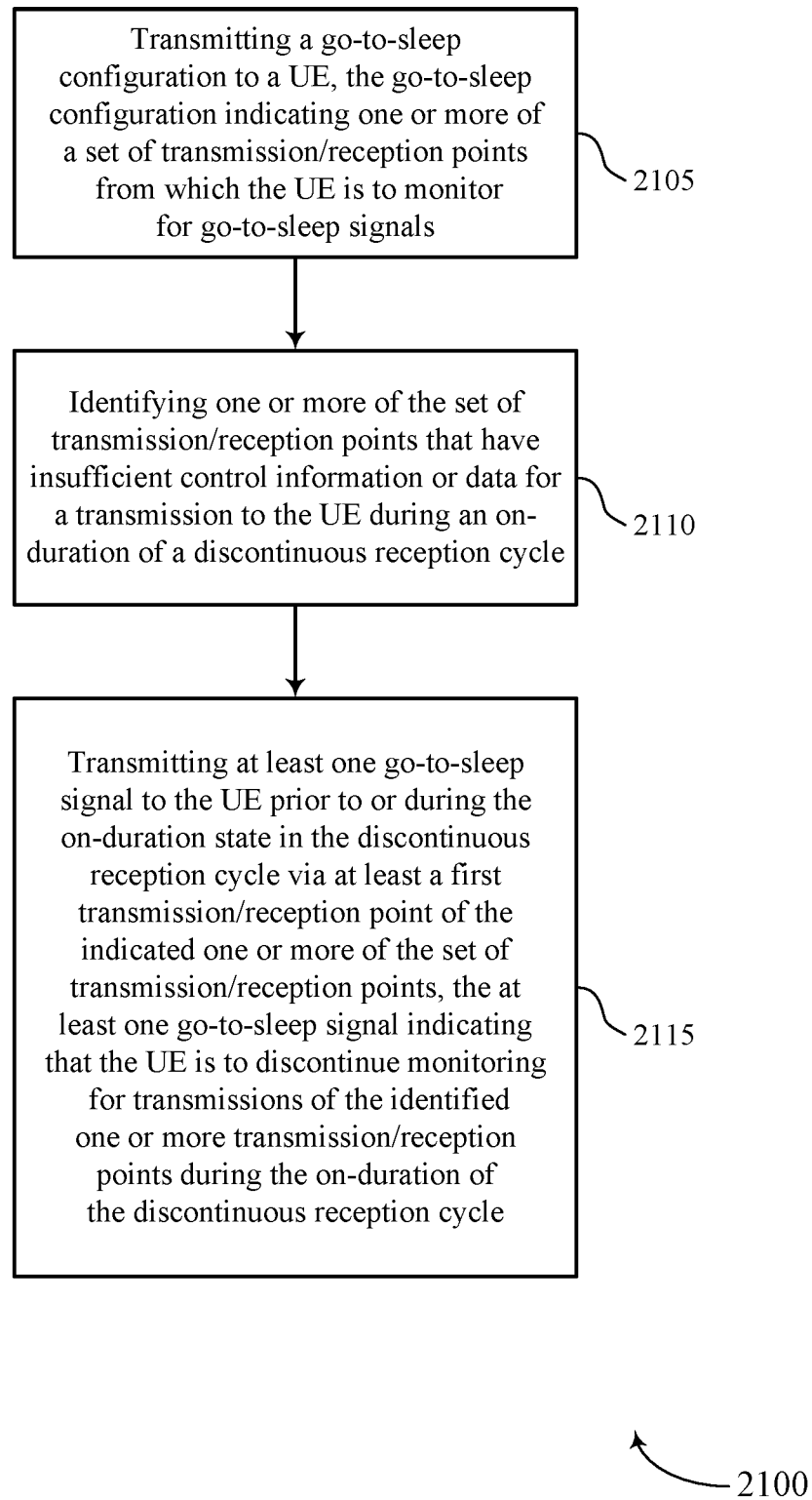

The code 1435 may include instructions to implement aspects of the present disclosure, including instructions to support wireless communications such as described, for example, with reference to FIGS. 20-21. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
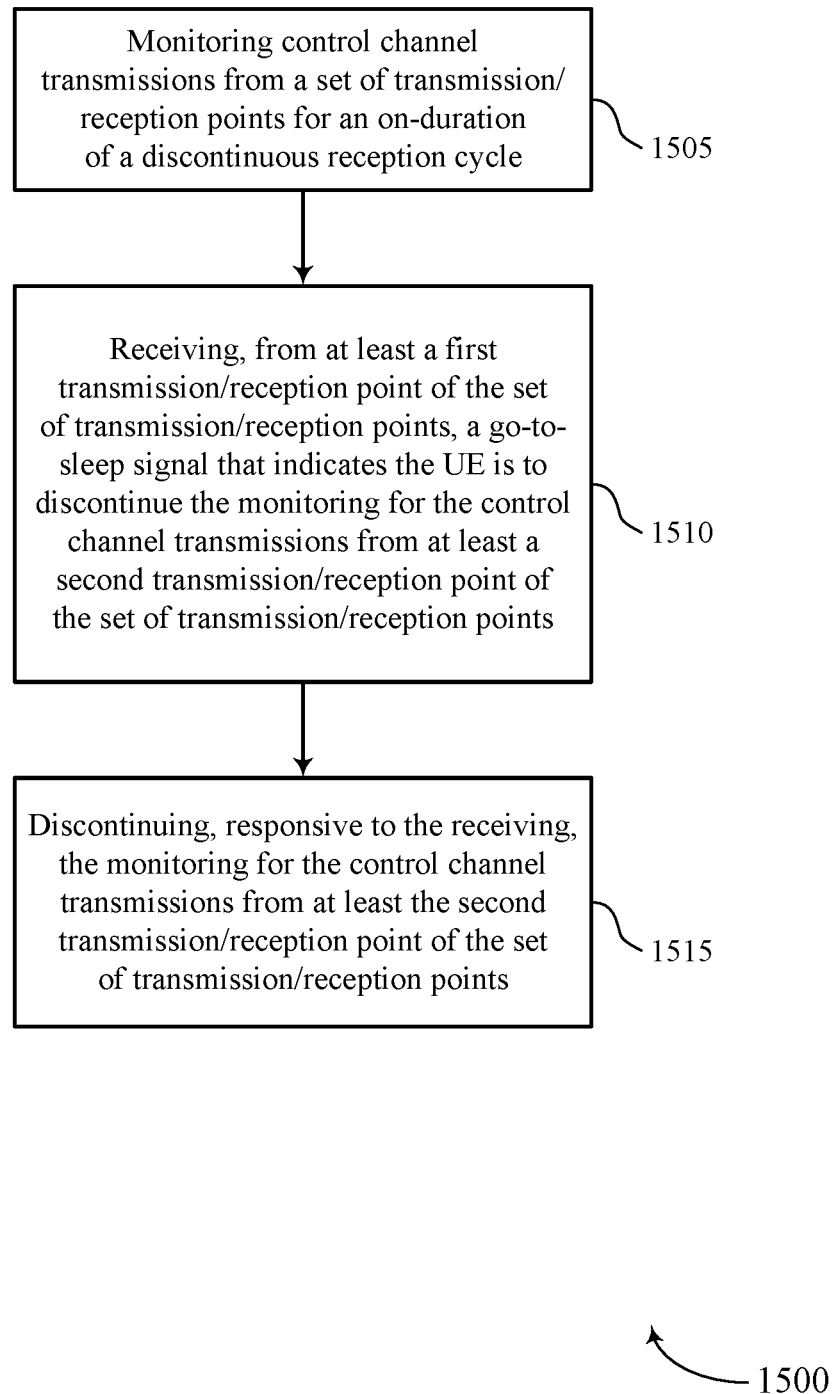
FIGS. 15 through 21 show flowcharts illustrating methods that support techniques for signaling go-to-sleep for multiple transmission/reception points in accordance with various aspects of the present disclosure.

FIG. 15 shows a flowchart illustrating a method 1500 that supports techniques for signaling go-to-sleep for multiple transmission/reception points in accordance with various aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may perform operations of monitoring of control channel transmissions from a set of transmission/reception points for an on-duration of a discontinuous reception cycle. The operations of 1505 may be performed according to the methods described herein. In some examples, aspects of the operations of 1505 may be performed by a DRX manager as described with reference to FIGS. 7 through 10.

At 1510, the UE may perform operations of receiving, from at least a first transmission/reception point of the set of transmission/reception points, a go-to-sleep signal that indicates the UE is to discontinue the monitoring for the control channel transmissions from at least a second transmission/reception point of the set of transmission/reception points. The operations of 1510 may be performed according to the methods described herein. In some examples, aspects of the operations of 1510 may be performed by a GTS receiver as described with reference to FIGS. 7 through 10. In some cases, the first transmission/reception point may transmit a go-to-sleep signal that indicates the UE is to discontinue the monitoring for the control channel transmissions from only the second transmission/reception point of the set of transmission/reception points, where the first transmission/reception point is the same as the second transmission/reception point. In other cases, the first transmission/reception point may transmit a go-to-sleep signal that indicates the UE is to discontinue the monitoring for the control channel transmissions from at least the second transmission/reception point of the set of transmission/reception points, where the first transmission/reception point is different than the second transmission/reception point.

At 1515, the method may include the UE discontinuing, responsive to the receiving, the monitoring for the control channel transmissions from at least the second transmission/reception point of the set of transmission/reception points. The operations of 1515 may be performed according to the methods described herein. In some examples, aspects of the operations of 1515 may be performed by a GTS manager as described with reference to FIGS. 7 through 10.

Figure 16:
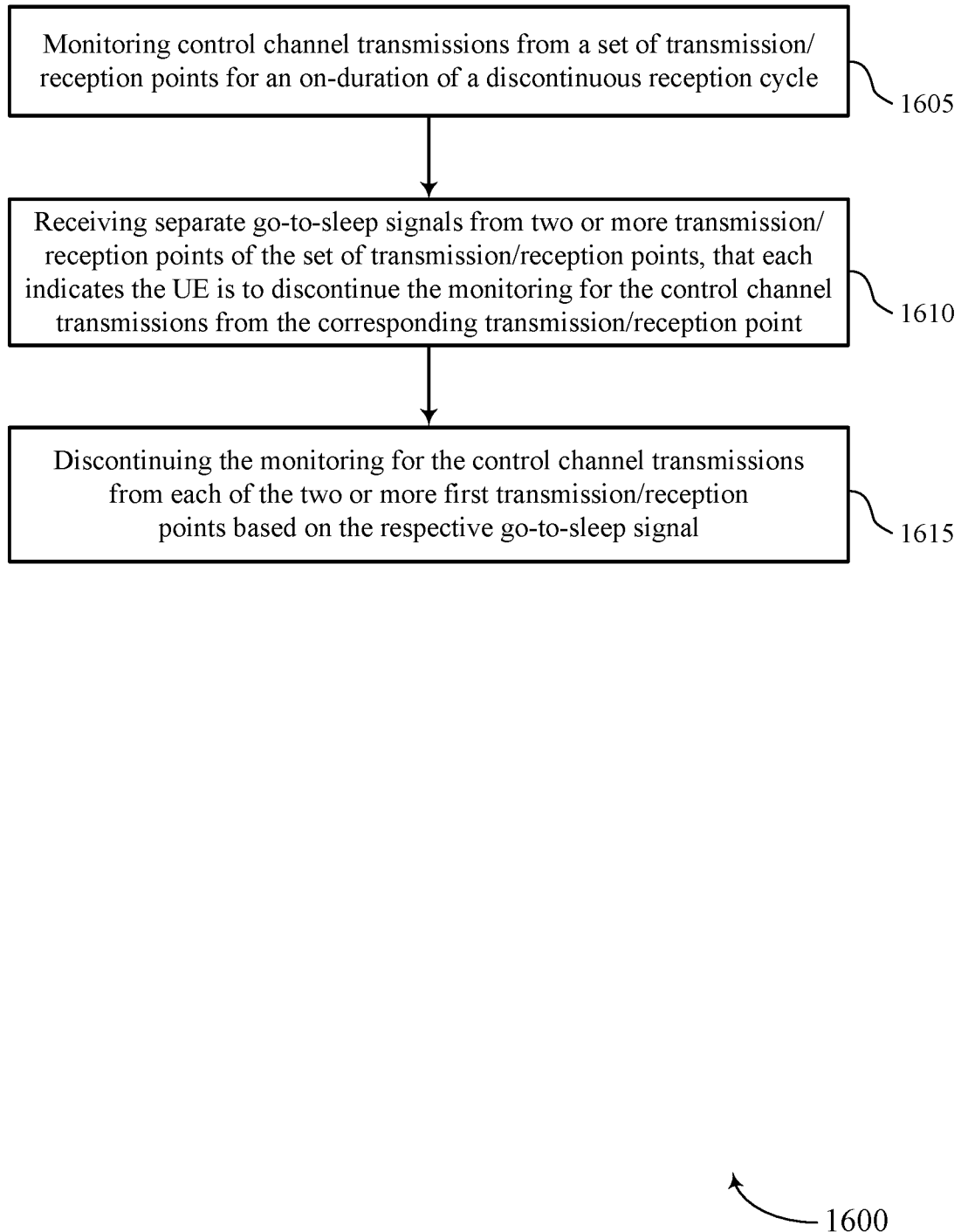

FIG. 16 shows a flowchart illustrating a method 1600 that supports techniques for signaling go-to-sleep for multiple transmission/reception points in accordance with various aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may perform operations of monitoring of control channel transmissions from a set of transmission/reception points for an on-duration of a discontinuous reception cycle. The operations of 1605 may be performed according to the methods described herein. In some examples, aspects of the operations of 1605 may be performed by a DRX manager as described with reference to FIGS. 7 through 10.

At 1610, the UE may perform operations of receiving separate go-to-sleep signals from two or more transmission/reception points of the set of transmission/reception points that each indicates the UE is to discontinue the monitoring for the control channel transmissions from the corresponding transmission/reception point. The operations of 1610 may be performed according to the methods described herein. In some examples, aspects of the operations of 1610 may be performed by a GTS receiver as described with reference to FIGS. 7 through 10.

At 1615, the UE may perform operations of discontinuing the monitoring for the control channel transmissions from each of the two or more first transmission/reception points based on the respective go-to-sleep signal. The operations of 1615 may be performed according to the methods described herein. In some examples, aspects of the operations of 1615 may be performed by a GTS receiver as described with reference to FIGS. 7 through 10.

Figure 17:
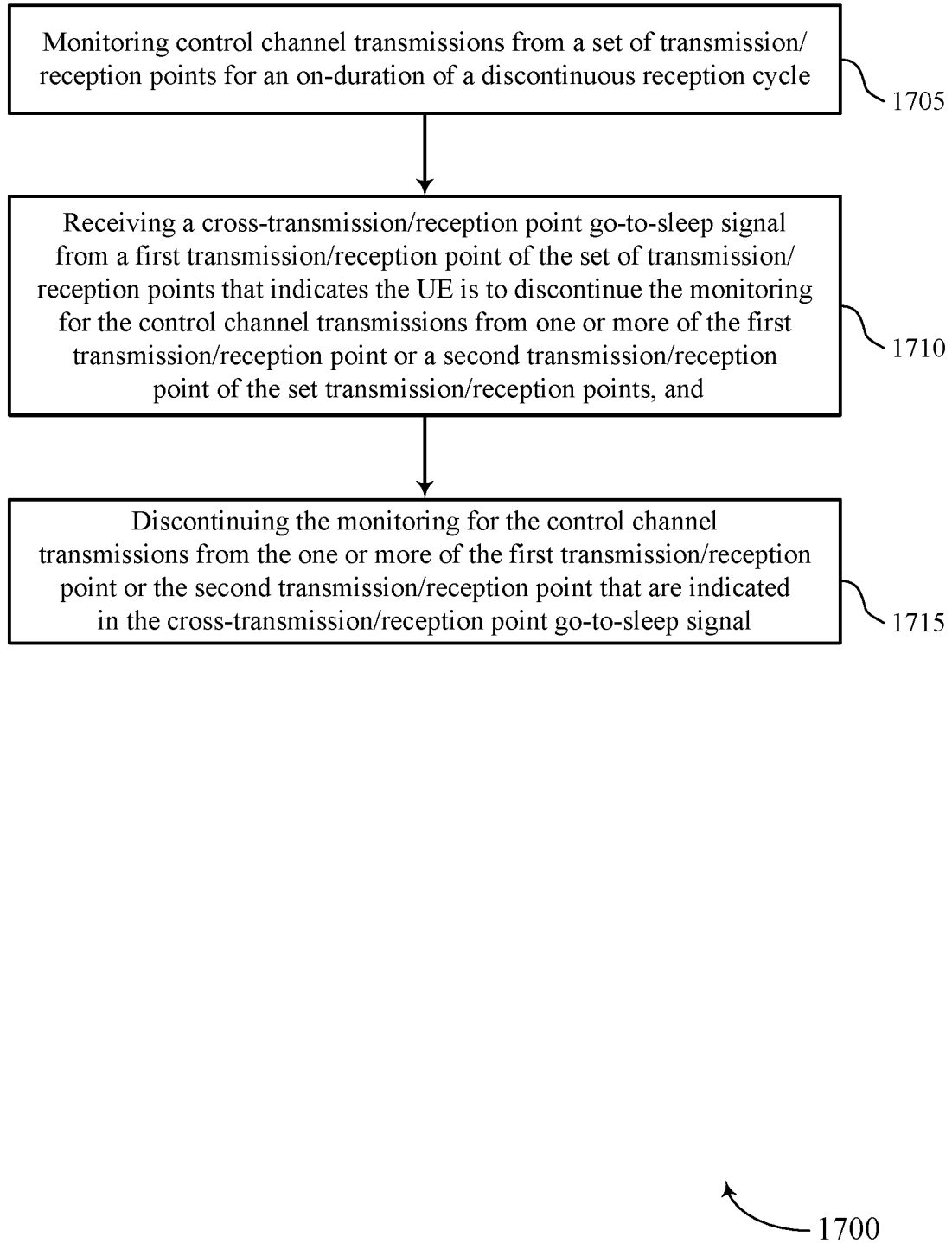

FIG. 17 shows a flowchart illustrating a method 1700 that supports techniques for signaling go-to-sleep for multiple transmission/reception points in accordance with various aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may perform operations of monitoring control channel transmissions from a set of transmission/reception points for an on-duration of a discontinuous reception cycle. The operations of 1705 may be performed according to the methods described herein. In some examples, aspects of the operations of 1705 may be performed by a DRX manager as described with reference to FIGS. 7 through 10.

At 1710, the UE may perform operations of receiving a cross-transmission/reception point go-to-sleep signal from the first transmission/reception point of the set of transmission/reception points that indicates the UE is to discontinue the monitoring for the control channel transmissions from one or more of the first transmission/reception point or a second transmission/reception point of the set transmission/reception points. The operations of 1710 may be performed according to the methods described herein. In some examples, aspects of the operations of 1710 may be performed by a GTS receiver as described with reference to FIGS. 7 through 10.

At 1715, the UE may perform operations of discontinuing the monitoring for the control channel transmissions from the one or more of the first transmission/reception point or the second transmission/reception point that are indicated in the cross-transmission/reception point go-to-sleep signal. The operations of 1715 may be performed according to the methods described herein. In some examples, aspects of the operations of 1715 may be performed by a GTS manager as described with reference to FIGS. 7 through 10.

Figure 18:
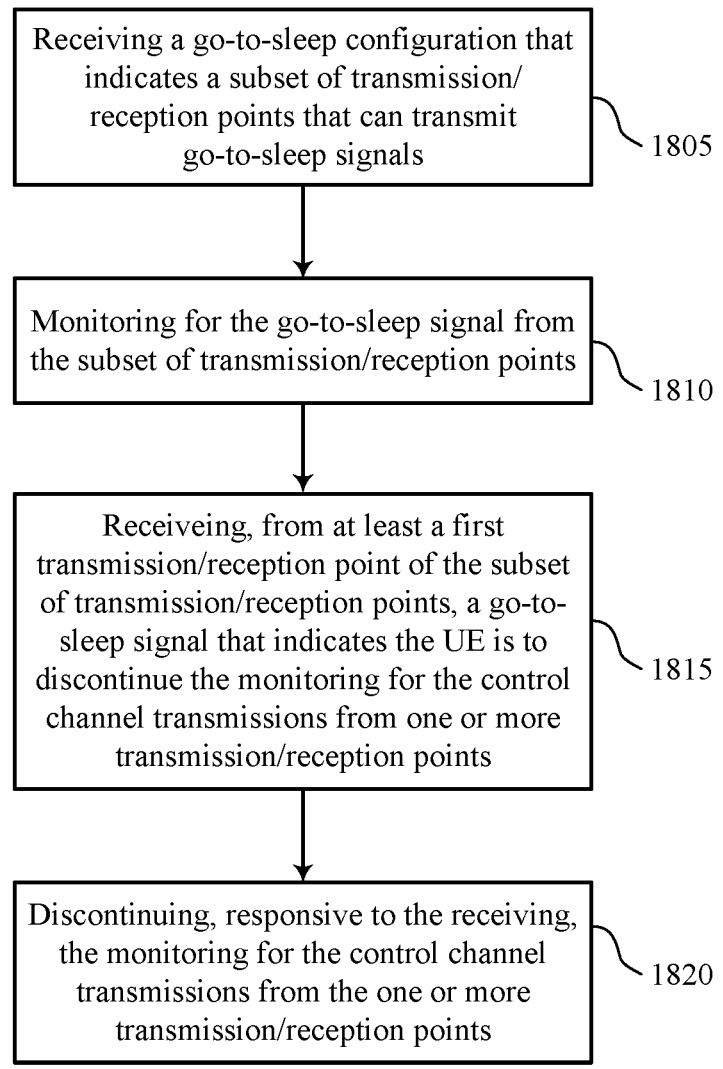

FIG. 18 shows a flowchart illustrating a method 1800 that supports techniques for signaling go-to-sleep for multiple transmission/reception points in accordance with various aspects of the present disclosure. The operations of method 1800 may be implemented by a UE 115 or its components as described herein. For example, the operations of method 1800 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1805, the UE may perform operations of receiving a go-to-sleep configuration that indicates a subset of transmission/reception points that can transmit go-to-sleep signals. The operations of 1805 may be performed according to the methods described herein. In some examples, aspects of the operations of 1805 may be performed by a configuration manager as described with reference to FIGS. 7 through 10.

At 1810, the UE may perform operations of monitoring for the go-to-sleep signal from the subset of transmission/reception points. The operations of 1810 may be performed according to the methods described herein. In some examples, aspects of the operations of 1810 may be performed by a GTS receiver as described with reference to FIGS. 7 through 10.

At 1815, the UE may perform operations of receiving, from at least a first transmission/reception point of the set of transmission/reception points, a go-to-sleep signal that indicates the UE is to discontinue the monitoring for the control channel transmissions from at least a second transmission/reception point of the set of transmission/reception points. The operations of 1815 may be performed according to the methods described herein. In some examples, aspects of the operations of 1815 may be performed by a GTS receiver as described with reference to FIGS. 7 through 10.

At 1820, the UE may perform operations of discontinuing, responsive to the receiving, the monitoring for the control channel transmissions from at least the second transmission/reception point of the set of transmission/reception points. The operations of 1820 may be performed according to the methods described herein. In some examples, aspects of the operations of 1820 may be performed by a GTS manager as described with reference to FIGS. 7 through 10.

Figure 19:
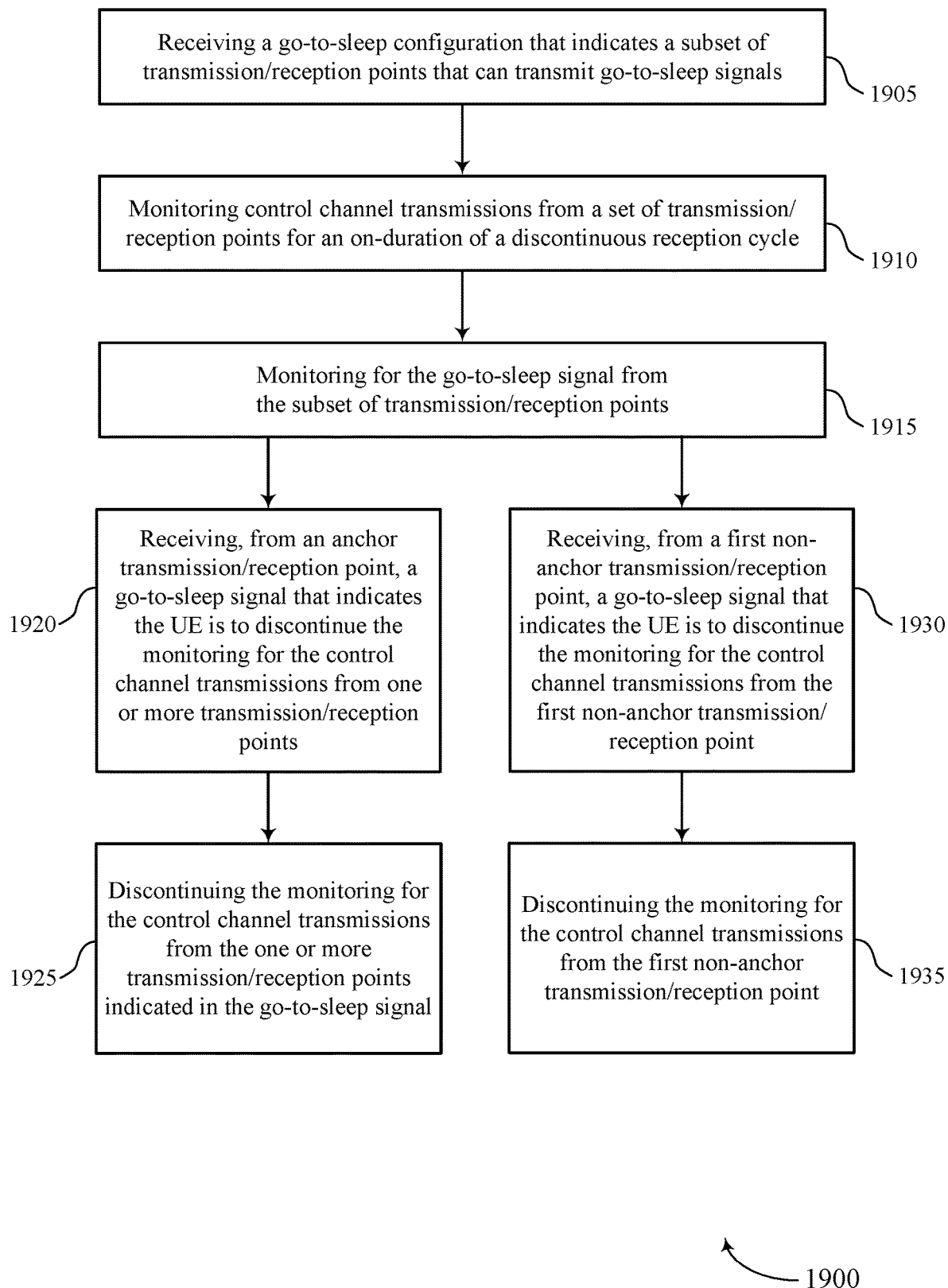

FIG. 19 shows a flowchart illustrating a method 1900 that supports techniques for signaling go-to-sleep for multiple transmission/reception points in accordance with various aspects of the present disclosure. The operations of method 1900 may be implemented by a UE 115 or its components as described herein. For example, the operations of method 1900 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1905, the UE may perform operations of receiving a go-to-sleep configuration that indicates a subset of transmission/reception points that can transmit go-to-sleep signals. The operations of 1905 may be performed according to the methods described herein. In some examples, aspects of the operations of 1905 may be performed by a configuration manager as described with reference to FIGS. 7 through 10.

At 1910, the UE may perform operations of monitoring control channel transmissions from a set of transmission/reception points for an on-duration of a discontinuous reception cycle. The operations of 1910 may be performed according to the methods described herein. In some examples, aspects of the operations of 1910 may be performed by a DRX manager as described with reference to FIGS. 7 through 10.

At 1915, the UE may perform operations of monitoring for the go-to-sleep signal from the subset of transmission/reception points. The operations of 1915 may be performed according to the methods described herein. In some examples, aspects of the operations of 1915 may be performed by a GTS receiver as described with reference to FIGS. 7 through 10.

At 1920, the UE may optionally perform operations of receiving, from an anchor transmission/reception point, a go-to-sleep signal that indicates the UE is to discontinue the monitoring for the control channel transmissions from one or more transmission/reception points. The operations of 1920 may be performed according to the methods described herein. In some examples, aspects of the operations of 1920 may be performed by a GTS receiver as described with reference to FIGS. 7 through 10.

At 1925, the UE may optionally perform operations of discontinuing the monitoring for the control channel transmissions from the one or more transmission/reception points indicated in the go-to-sleep signal. The operations of 1925 may be performed according to the methods described herein. In some examples, aspects of the operations of 1925 may be performed by a GTS manager as described with reference to FIGS. 7 through 10.

Additionally or alternatively, at 1930, the UE perform operations of receiving, from a first non-anchor transmission/reception point, a go-to-sleep signal that indicates the UE is to discontinue the monitoring for the control channel transmissions from the first non-anchor transmission/reception point. The operations of 1930 may be performed according to the methods described herein. In some examples, aspects of the operations of 1930 may be performed by a configuration manager as described with reference to FIGS. 7 through 10.

At 1935, the UE may optionally perform operations of discontinuing the monitoring for the control channel transmissions from the first non-anchor transmission/reception point. The operations of 1935 may be performed according to the methods described herein. In some examples, aspects of the operations of 1935 may be performed by a GTS receiver as described with reference to FIGS. 7 through 10.

FIG. 20 shows a flowchart illustrating a method 2000 that supports techniques for signaling go-to-sleep for multiple transmission/reception points in accordance with various aspects of the present disclosure. The operations of method 2000 may be implemented by a base station 105 or its components as described herein. For example, the operations of method 2000 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2005, the base station may perform operations of determining that one or more transmission/reception points of a set of transmission/reception points have insufficient control information or data for a transmission to a UE during an on-duration of a discontinuous reception cycle. The operations of 2005 may be performed according to the methods described herein. In some examples, aspects of the operations of 2005 may be performed by a GTS manager as described with reference to FIGS. 11 through 14.

At 2010, the base station may perform operations of transmitting one or more go-to-sleep indications to the UE that identify the determined one or more transmission/reception points of the set of transmission/reception points for which the UE is to discontinue monitoring for control channel transmissions. The operations of 2010 may be performed according to the methods described herein. In some examples, aspects of the operations of 2010 may be performed by a GTS transmitter as described with reference to FIGS. 11 through 14.

FIG. 21 shows a flowchart illustrating a method 2100 that supports techniques for signaling go-to-sleep for multiple transmission/reception points in accordance with various aspects of the present disclosure. The operations of method 2100 may be implemented by a base station 105 or its components as described herein. For example, the operations of method 2100 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2105, the base station may perform operations of transmitting a go-to-sleep configuration to a UE, the go-to-sleep configuration indicating one or more of a set of transmission/reception points from which the UE is to monitor for go-to-sleep signals. The operations of 2105 may be performed according to the methods described herein. In some examples, aspects of the operations of 2105 may be performed by a configuration manager as described with reference to FIGS. 11 through 14.

At 2110, the base station may perform operations of identifying one or more of the set of transmission/reception points that have insufficient control information or data for a transmission to the UE during an on-duration of a discontinuous reception cycle. The operations of 2110 may be performed according to the methods described herein. In some examples, aspects of the operations of 2110 may be performed by a GTS manager as described with reference to FIGS. 11 through 14.

At 2115, the base station may perform operations of transmitting at least one go-to-sleep signal to the UE prior to or during the on-duration state in the discontinuous reception cycle via at least a first transmission/reception point of the indicated one or more of the set of transmission/reception points, the at least one go-to-sleep signal indicating that the UE is to discontinue monitoring for transmissions of the identified one or more transmission/reception points during the on-duration of the discontinuous reception cycle. The operations of 2115 may be performed according to the methods described herein. In some examples, aspects of the operations of 2115 may be performed by a GTS transmitter as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:

monitoring control channel transmissions from a plurality of transmission/reception points for an on-duration of a discontinuous reception cycle;

receiving, from a first transmission/reception point of the plurality of transmission/reception points, a go-to-sleep signal that indicates the UE is to discontinue the monitoring for the control channel transmissions from one or more of the plurality of transmission/reception points, including at least a second transmission/reception point of the plurality of transmission/reception points, wherein the second transmission/reception point is different from the first transmission/reception point, the go-to-sleep signal comprises separate go-to-sleep signals from two or more transmission/reception points of the plurality of transmission/reception points, and at least a first go-to-sleep signal and a second go-to-sleep signal of the separate go-to-sleep signals are independent of each other, and wherein the second go-to-sleep signal is received before, concurrently with, or after, the first go-to-sleep signal; and discontinuing, responsive to the receiving, the monitoring for the control channel transmissions from each transmission/reception point indicated in the go-to-sleep signal, including at least the second transmission/reception point of the plurality of transmission/reception points, wherein the discontinuing comprises discontinuing the monitoring for the control channel transmissions from each of the two or more transmission/reception points based at least in part on the first go-to-sleep signal and the second go-to-sleep signal.

2. The method of claim 1, wherein the receiving comprises:

receiving a cross-transmission/reception point go-to-sleep signal from the first transmission/reception point of the plurality of transmission/reception points that indicates the UE is to discontinue the monitoring for the control channel transmissions from one or more of the first transmission/reception point or the second transmission/reception point of the plurality transmission/reception points; and wherein the discontinuing comprises discontinuing the monitoring for the control channel transmissions from the one or more of the first transmission/reception point or the second transmission/reception point that are indicated in the cross-transmission/reception point go-to-sleep signal.

3. The method of claim 2, wherein the cross-transmission/reception point go-to-sleep signal indicates a subset of transmission/reception points of the plurality of transmission/reception points for which the UE is to discontinue the monitoring for the control channel transmissions.

4. The method of claim 3, wherein the cross-transmission/reception point go-to-sleep signal provides explicit indication of indices of the subset of transmission/reception points or an indication of transmission configuration indication states corresponding to the indices of the subset of transmission/reception points, and wherein the UE discontinues monitoring for the control channel transmissions from each transmission/reception point indicated by the indices.

5. The method of claim 3, wherein the cross-transmission/reception point go-to-sleep signal further indicates a go-to-sleep duration for each transmission/reception point of the subset of transmission/reception points, and wherein the UE discontinues monitoring for the control channel transmissions from each of the subset of transmission/reception points for a time duration corresponding to the indicated go-to-sleep duration of each transmission/reception point of the subset of transmission/reception points.

6. The method of claim 2, wherein the cross-transmission/reception point go-to-sleep signal indicates that the UE is to discontinue the monitoring for the control channel transmissions from all of the plurality of transmission/reception points.

7. The method of claim 1, wherein the go-to-sleep signal indicates a time duration during which the UE is to discontinue monitoring for the control channel transmissions.

8. The method of claim 1, wherein the discontinuing the monitoring for the control channel transmissions comprises deactivating one or more antenna panels at the UE associated with one or more transmission/reception points of the plurality of transmission/reception points.

9. The method of claim 1, further comprising:
receiving a go-to-sleep configuration that indicates a subset of transmission/reception points that can transmit go-to-sleep signals; and
monitoring for the go-to-sleep signal from the subset of transmission/reception points, wherein the subset of transmission/reception points include only anchor transmission/reception points of the plurality of transmission/reception points.

10. The method of claim 9, wherein the go-to-sleep configuration indicates that an anchor transmission/reception point of the plurality of transmission/reception points can transmit a cross-transmission/reception point go-to-sleep signal, and that non-anchor transmission/reception points can transmit the go-to-sleep signals only for an associated non-anchor transmission/reception point.

11. The method of claim 10, further comprising:
receiving the cross-transmission/reception point go-to-sleep signal from the anchor transmission/reception point; and deactivating one or more antenna panels at the UE associated with one or more transmission/reception points indicated in the cross-transmission/reception point go-to-sleep signal.

12. The method of claim 10, further comprising:
receiving the go-to-sleep signal from a first non-anchor transmission/reception point; and
deactivating one or more antenna panels at the UE associated with the first non-anchor transmission/reception point.

13. The method of claim 9, wherein the go-to-sleep configuration is received in a radio resource control message from an anchor transmission/reception point.

14. The method of claim 1, wherein the go-to-sleep signal is received in one or more of a medium access control element, a downlink control information message, or a radio resource control message.

15. A method for wireless communication at a network entity, comprising:
transmitting a go-to-sleep configuration to a user equipment (UE), the go-to-sleep configuration indicating one or more of a plurality of transmission/reception points from which the UE is to monitor for go-to-sleep signals;
identifying the one or more of the plurality of transmission/reception points have insufficient control information or data for a transmission to the UE during an on-duration of a discontinuous reception cycle; and
transmitting at least one go-to-sleep signal to the UE prior to or during the on-duration in the discontinuous reception cycle via at least a first transmission/reception point of the indicated one or more of the plurality of transmission/reception points, the at least one go-to-sleep signal indicating that the UE is to discontinue monitoring for transmissions of each of the identified one or more transmission/reception points during the on-duration of the discontinuous reception cycle, wherein the identified one or more transmission/reception points comprises at least a second transmission/reception point different from the first transmission/reception point, the at least one go-to-sleep signal comprises separate go-to-sleep signals from two or more transmission/reception points of the plurality of transmission/reception points, and at least a first go-to-sleep signal and a second go-to-sleep signal of the separate go-to-sleep signals are independent of each other, and wherein the second go-to-sleep signal is transmitted before, concurrently with, or after, the first go-to-sleep signal, and wherein the go-to-sleep signals indicate that the UE is to discontinue the monitoring for the transmissions from each of the two or more transmission/reception points based at least in part on the first go-to-sleep signal and the second go-to-sleep signal.

16. The method of claim 15, wherein the go-to-sleep configuration indicates one or more anchor transmission/reception points that the UE is to monitor for the go-to-sleep signals, and wherein the first transmission/reception point is an anchor transmission/reception point.

17. The method of claim 16, wherein the at least one go-to-sleep signal is a cross-transmission/reception point go-to-sleep signal indicates a subset of transmission/reception points of the plurality of transmission/reception points for which the UE is to discontinue the monitoring for the transmissions.

18. The method of claim 17, wherein the cross-transmission/reception point go-to-sleep signal provides explicit indication of indices of the subset of transmission/reception points or an indication of transmission configuration indication states corresponding to the indices of the subset of transmission/reception points.

19. The method of claim 17, wherein the cross-transmission/reception point go-to-sleep signal further indicates a go-to-sleep duration for each transmission/reception point of the sub set of transmission/reception points.

20. The method of claim 16, wherein the go-to-sleep configuration further indicates that the UE is to discontinue the monitoring for the transmissions from all of the plurality of transmission/reception points responsive to a go-to-sleep signal from the anchor transmission/reception point.

21. The method of claim 15, wherein the go-to-sleep configuration indicates that an anchor transmission/reception point of the plurality of transmission/reception points can transmit a cross-transmission/reception point go-to-sleep signal, and that non-anchor transmission/reception points can transmit a go-to-sleep signal only for an associated non-anchor transmission/reception point.

22. The method of claim 15, wherein the go-to-sleep configuration is transmitted in a radio resource control message to the UE.

23. The method of claim 15, wherein the at least one go-to-sleep signal is transmitted in one or more of a medium access control element, a downlink control information message, or a radio resource control message.

24. An apparatus for wireless communication at a user equipment (UE), comprising:
a processor, memory coupled with the processor; and instructions stored in the memory and executable by the processor to cause the apparatus to:
monitor control channel transmissions from a plurality of transmission/reception points for an on-duration of a discontinuous reception cycle;
receive, from a first transmission/reception point of the plurality of transmission/reception points, a go-to-sleep signal that indicates the UE is to discontinue the monitoring for the control channel transmissions from one or more of the plurality of transmission/ reception points, including at least a second transmission/reception point of the plurality of transmission/reception points, wherein the second transmission/reception point is different from the first transmission/reception point, the go-to-sleep signal comprises separate go-to-sleep signals from two or more transmission/reception points of the plurality of transmission/reception points, and at least a first go-to-sleep signal and a second go-to-sleep signal of the separate go-to-sleep signals are independent of each other, and wherein the second go-to-sleep signal is received before, concurrently with, or after, the first go-to-sleep signal; and discontinue, responsive to the receiving, the monitoring for the control channel transmissions from each transmission/reception point indicated in the go-to-sleep signal, including at least the second transmission/reception point of the plurality of transmission/reception points, wherein the monitoring is discontinued for the control channel transmissions from each of the two or more transmission/reception points based at least in part on the first go-to-sleep signal and the second go-to-sleep signal.

25. An apparatus for wireless communication at a network entity, comprising:
a processor;
memory coupled with the processor; and
instructions stored in the memory and executable by the processor to cause the apparatus to:
transmit a go-to-sleep configuration to a user equipment (UE), the go-to-sleep configuration indicating one or more of a plurality of transmission/reception points from which the UE is to monitor for go-to-sleep signals;
identify the one or more of the plurality of transmission/reception points that have insufficient control information or data for a transmission to the UE during an on-duration of a discontinuous reception cycle; and
transmit at least one go-to-sleep signal to the UE prior to or during the on-duration in the discontinuous reception cycle via at least a first transmission/reception point of the indicated one or more of the plurality of transmission/reception points, the at least one go-to-sleep signal indicating that the UE is to discontinue monitoring for transmissions of each of the identified one or more transmission/reception points during the on-duration of the discontinuous reception cycle, wherein the identified one or more transmission/reception points comprises at least a second transmission/reception point different from the first transmission/reception point, the at least one go-to-sleep signal comprises separate go-to-sleep signals from two or more transmission/reception points of the plurality of transmission/reception points, and at least a first go-to-sleep signal and a second go-to-sleep signal of the separate go-to-sleep signals are independent of each other, and wherein the second go-to-sleep signal is transmitted before, concurrently with, or after, the first go-to-sleep signal, and wherein the go-to-sleep signals indicate that the UE is to discontinue the monitoring for the transmissions from each of the two or more transmission/reception points based at least in part on the first go-to-sleep signal and the second go-to-sleep signal.

* * * * *